US011828971B2

(12) United States Patent
Nakabayashi et al.

(10) Patent No.: US 11,828,971 B2
(45) Date of Patent: Nov. 28, 2023

(54) LIGHT-EMITTING MODULE AND PLANAR LIGHT SOURCE

(71) Applicant: NICHIA CORPORATION, Anan (JP)

(72) Inventors: Takuya Nakabayashi, Tokushima (JP); Toru Hashimoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 79 days.

(21) Appl. No.: 17/513,875

(22) Filed: Oct. 28, 2021

(65) Prior Publication Data

US 2022/0146739 A1 May 12, 2022

(30) Foreign Application Priority Data

Nov. 6, 2020 (JP) .................... 2020-185575

(51) Int. Cl.
*F21V 8/00* (2006.01)
(52) U.S. Cl.
CPC .......... *G02B 6/0051* (2013.01); *G02B 6/0065* (2013.01); *G02B 6/0068* (2013.01); *G02B 6/0038* (2013.01)
(58) Field of Classification Search
CPC .. G02B 6/0051; G02B 6/0065; G02B 6/0068; G02B 6/0038
See application file for complete search history.

(56) References Cited

U.S. PATENT DOCUMENTS

2004/0001330 A1* 1/2004 Kang ................ G02F 1/133611
362/613
2010/0265432 A1 10/2010 Masuda et al.
2013/0343061 A1 12/2013 Liao et al.
2015/0077990 A1 3/2015 Park et al.
2016/0356940 A1* 12/2016 Ngai ..................... G02B 6/0068
2020/0049877 A1 2/2020 Watanabe et al.

FOREIGN PATENT DOCUMENTS

| JP | 2007-207598 A | 8/2007 |
| JP | 2007-329114 A | 12/2007 |
| JP | 2009-150940 A | 7/2009 |
| JP | 2009-157115 A | 7/2009 |
| JP | 2018-101521 A | 6/2018 |
| WO | 2009/098809 A1 | 8/2009 |
| WO | 2012132899 A1 | 10/2012 |
| WO | 2018/116815 A1 | 6/2018 |

* cited by examiner

*Primary Examiner* — Alicia M Harrington
*Assistant Examiner* — Jessica M Apenteng
(74) *Attorney, Agent, or Firm* — Global IP Counselors, LLP

(57) ABSTRACT

A light-emitting module includes first and second light sources, first and second light guide parts, and a first light-modulating member. The first light guide part includes a first A-major surface, a first B-major surface, a first side surface positioned between the first A-major surface and the first B-major surface, and a first hole portion in which the first light source is disposed. The second light guide part includes a second A-major surface, a second B-major surface, a second side surface positioned between the second A-major surface and the second B-major surface, the second side surface facing the first side surface, and a second hole portion in which the second light source is disposed. The first light-modulating member is positioned at an upper side of the first A-major surface. The first light-modulating member overlaps the first A-major surface and the first side surface when viewed in top-view.

17 Claims, 16 Drawing Sheets

LIGHT-EMITTING MODULE AND PLANAR LIGHT SOURCE

CROSS-REFERENCE TO RELATED APPLICATIONS

This application is based upon and claims the benefit of priority from the prior Japanese Patent Application No. 2020-185575, filed on Nov. 6, 2020; the entire contents of which are incorporated herein by reference.

FIELD

Embodiments relate to a light-emitting module and a planar light source.

BACKGROUND

A light-emitting module in which a light guide plate is combined with a light-emitting element such as a light-emitting diode or the like is widely utilized in a planar light source such as, for example, the backlight of a liquid crystal display or the like. A planar light source also has been proposed in which a light guide plate is partitioned into multiple regions by a trench, and the light emission and non-emission can be controlled for each region (e.g., Japanese Laid-Open Patent Application Publication No. 2018-101521 A, etc.).

SUMMARY

It is desirable to further reduce the uneven luminance of a planar light source. Embodiments according to the invention are directed to a light-emitting module and a planar light source in which uneven luminance can be reduced.

According to one aspect of the invention, a light-emitting module includes a first light source, a second light source, a first light guide part, a second light guide part, and a first light-modulating member. The first light guide part includes a first A-major surface, a first B-major surface positioned at a side opposite to the first A-major surface, a first side surface positioned between the first A-major surface and the first B-major surface, and a first hole portion in which the first light source is disposed. The second light guide part includes a second A-major surface, a second B-major surface positioned at a side opposite to the second A-major surface, a second side surface positioned between the second A-major surface and the second B-major surface, the second side surface facing the first side surface of the first light guide part, and a second hole portion in which the second light source is disposed. The first light-modulating member is positioned at an upper side of the first A-major surface. The first light-modulating member overlaps the first A-major surface and the first side surface when viewed in top-view.

According to a light-emitting module of one embodiment of the invention, uneven luminance can be reduced.

DETAILED DESCRIPTION

Figure 1:
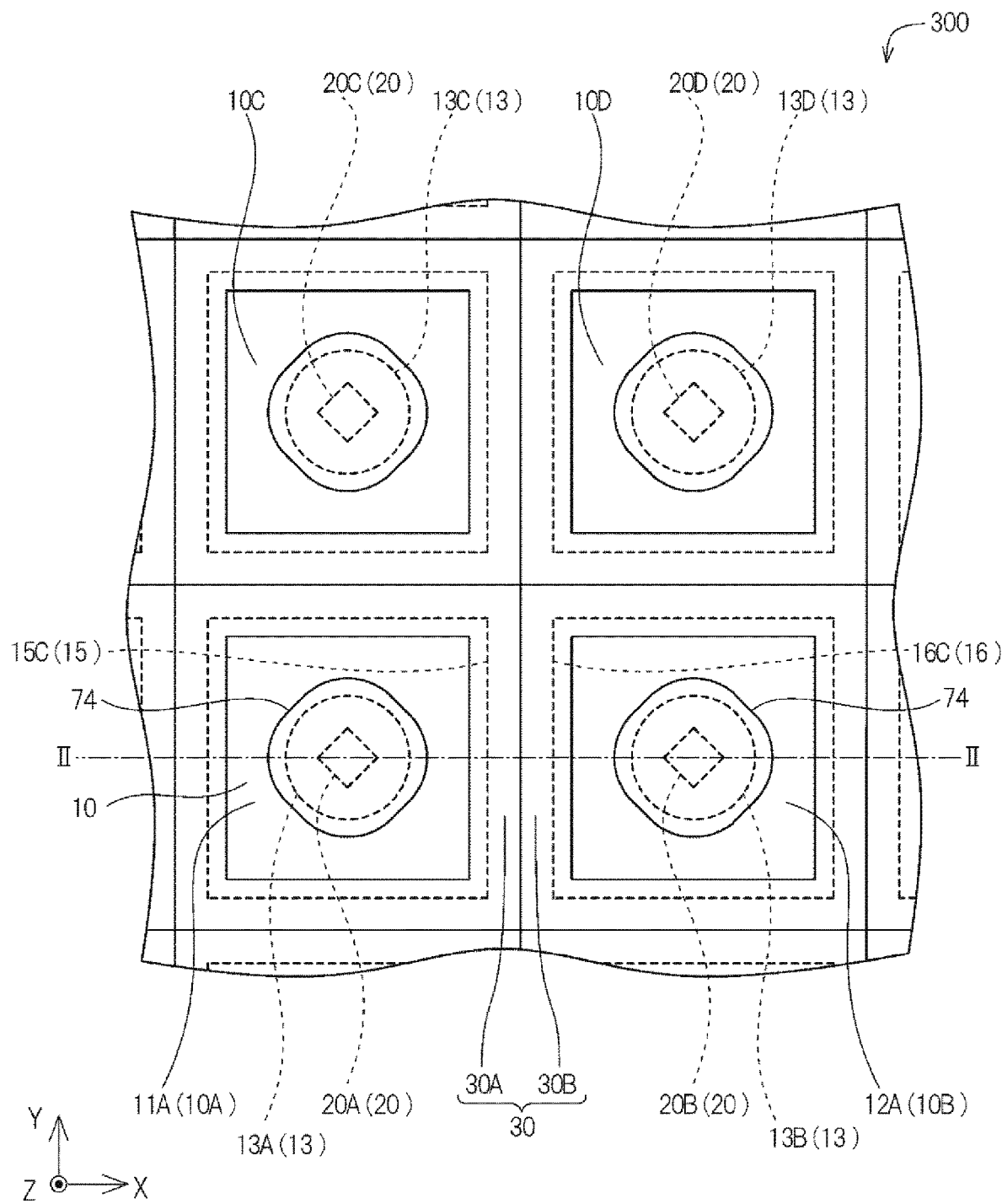
FIG. 1 is a schematic top view showing a planar light source according to an embodiment.

Embodiments will now be described with reference to the drawings. The drawings schematically show embodiments; therefore, the scales, spacing, positional relationships, and the like of the members may be exaggerated; some of the members may not be illustrated; and end views that show only cross sections may be used as cross-sectional views. The same configurations are marked with the same reference numerals in the drawings.

In the following description, components that have substantially the same function may be shown using common reference numerals; and a description may be omitted. Terms that indicate designated directions or positions (e.g., "up", "down", and other terms including such terms) may be used. Such terms, however, are used merely for better understanding of relative directions or positions when referring to the drawings. As long as the relationships are the same, the relative directions or positions according to terms such as "up", "down", etc., used when referring to the reference drawings may not have the same arrangements in drawings, actual products, and the like outside these embodiments. Unless otherwise specified in the specification, "parallel" includes the case where two straight lines, sides, surfaces, etc., are in a range of about ±5° from 0°. The positional relationship referred to as "on" in the specification includes the case of being in contact and the case of being positioned above without contact.

Embodiment

A planar light source 300 of an embodiment will now be described with reference to FIGS. 1 to 9. The planar light source 300 includes a light-emitting module 100 and a support member 200. The light-emitting module 100 is disposed on the support member 200. The light-emitting module 100 includes a light guide member 10, a light source part 20, and a first light-modulating member 30. The light guide member 10 includes a first light guide part 10A and a second light guide part 10B. The light guide member 10 may further include a third light guide part 10C and a fourth light guide part 10D. The number of the light guide members 10 included in the planar light source 300 is not limited to the number shown in FIG. 1 and can be set as appropriate. The first light guide part 10A includes a first A-major surface 11A, a first B-major surface 11B, a first side surface 15, and a first hole portion 13A. The first B-major surface 11B is positioned at the side opposite to the first A-major surface 11A. The first side surface 15 is positioned between the first A-major surface 11A and the first B-major surface 11B. The second light guide part 10B includes a second A-major surface 12A, a second B-major surface 12B, a second side surface 16, and a second hole portion 13B. The second B-major surface 12B is positioned at the side opposite to the second A-major surface 12A. The second side surface 16 is positioned between the second A-major surface 12A and the second B-major surface 12B and faces the first side surface 15. The light source part 20 includes a first light source 20A and a second light source 20B. The light source part 20 may further include a third light source 20C and a fourth light source 20D. The first light source 20A is disposed in the first hole portion 13A. The second light source 20B is disposed in the second hole portion 13B. Similarly, the third light source 20C is disposed in a third hole portion 13C of the third light guide part 10C; and the fourth light source 20D is disposed in a fourth hole portion 13D of the fourth light guide part 10D. The first light source 20A and the second light source 20B are arranged in a first direction. The first light source 20A and the third light source 20C are arranged in a second direction. A direction orthogonal to the first and second directions is taken as a third direction. In FIG. 1, the first direction is an X-direction; the second direction is a Y-direction; and the third direction is a Z-direction. The direction from the first light source 20A side toward the second light source 20B side may be called the +X direction; and the direction from the second light source 20B side toward the first light source 20A side may be called the −X direction. The direction from the first B-major surface 11B side toward the first A-major surface 11A side may be called the +Z direction; and the direction from the first A-major surface 11A side toward the first B-major surface 11B side may be called the −Z direction. The first light-modulating member 30 is positioned at the upper side of the first A-major surface 11A and overlaps the first A-major surface 11A and the first side surface 15 when viewed in top-view.

The first side surface 15 may diffusely reflect a portion of the light that is emitted from the first light source 20A and travels in the X-direction. Therefore, compared to the other regions, uneven luminance easily occurs at the vicinity of the first side surface 15. According to the embodiment, the light that is diffusely reflected by the first side surface 15 can be modulated by the first light-modulating member 30 because the first light-modulating member 30 is positioned at the upper side of the first A-major surface 11A and overlaps the first A-major surface 11A and the first side surface 15 when viewed in top-view. The uneven luminance of the light-emitting module 100 can be reduced thereby.

The components included in the planar light source 300 will now be elaborated.

Light Guide Member 10

The light guide member 10 is a member that is transmissive to the light emitted by the light source part 20. It is preferable for the transmittance of the light guide member 10 for the peak wavelength of the light source part 20 to be, for example, not less than 80%, and more favorably not less than 90%. The light guide member 10 includes the first light guide part 10A and the second light guide part 10B that are next to each other in the first direction (the X-direction). The light guide member 10 may further include the third light guide part 10C that is next to the first light guide part 10A in the second direction (the Y-direction), and the fourth light guide part 10D that is next to the second light guide part 10B in the second direction (the Y-direction). The third light guide part 10C and the fourth light guide part 10D are next to each other in the first direction (the X-direction). The second light guide part 10B, the third light guide part 10C, and the fourth light guide part 10D have structures similar to that of the first light guide part 10A, and a description is therefore omitted as appropriate.

For example, a thermoplastic resin such as acrylic, polycarbonate, cyclic polyolefin, polyethylene terephthalate, polyester, or the like, an epoxy, a thermosetting resin such as silicone or the like, glass, etc., can be used as the material of the light guide member 10.

It is preferable for the thickness of the light guide member 10 to be, for example, not less than 200 µm and not more than 800 µm. In the specification, the thickness of each member is taken to be the maximum value from the upper surface of each member to the lower surface of each member along the third direction (the Z-direction). The light guide member 10 may include a single layer in the third direction or may include a stacked body of multiple layers. When the light guide member 10 includes a stacked body, a transmissive bonding member may be located between the layers. The layers of the stacked body may include different types of major materials. For example, a thermoplastic resin such as acrylic, polycarbonate, cyclic polyolefin, polyethylene terephthalate, polyester, or the like, an epoxy, or a thermosetting resin such as silicone or the like can be used as the material of the bonding member.

Figure 2:
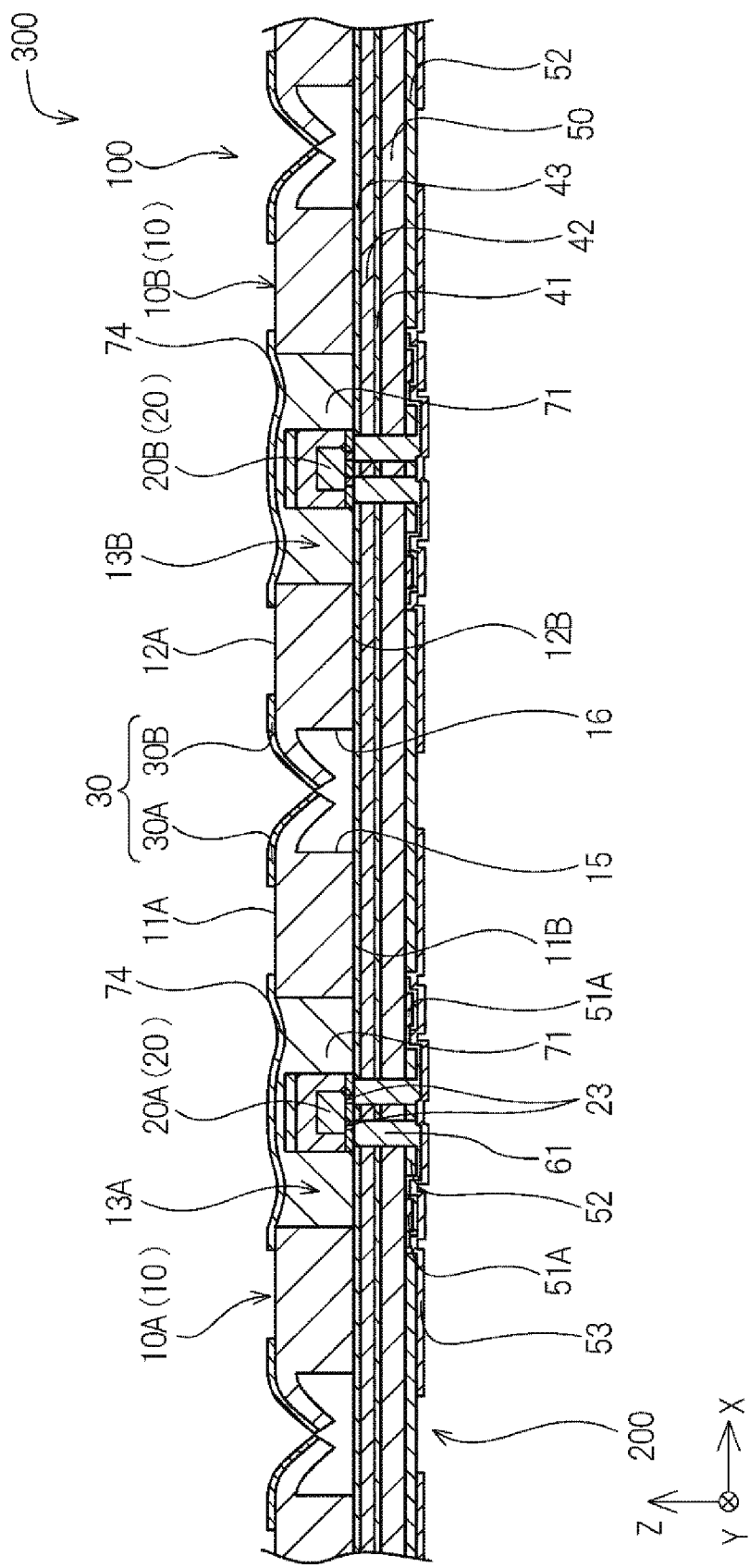
FIG. 2 is a schematic cross-sectional view along line II-II shown in FIG. 1.

As shown in FIG. 2, the first light guide part 10A includes the first A-major surface 11A that is used as the light-emitting surface of the planar light source 300, and the first B-major surface 11B that is positioned at the side opposite to the first A-major surface 11A. The first light guide part 10A includes the first side surface 15 that is positioned between the first A-major surface 11A and the first B-major surface 11B. The first side surface 15 is continuous with the first A-major surface 11A and the first B-major surface 11B. When viewed in cross-section, the first side surface 15 may be a straight line, may be a curve, or may include an unevenness.

Figure 3A:
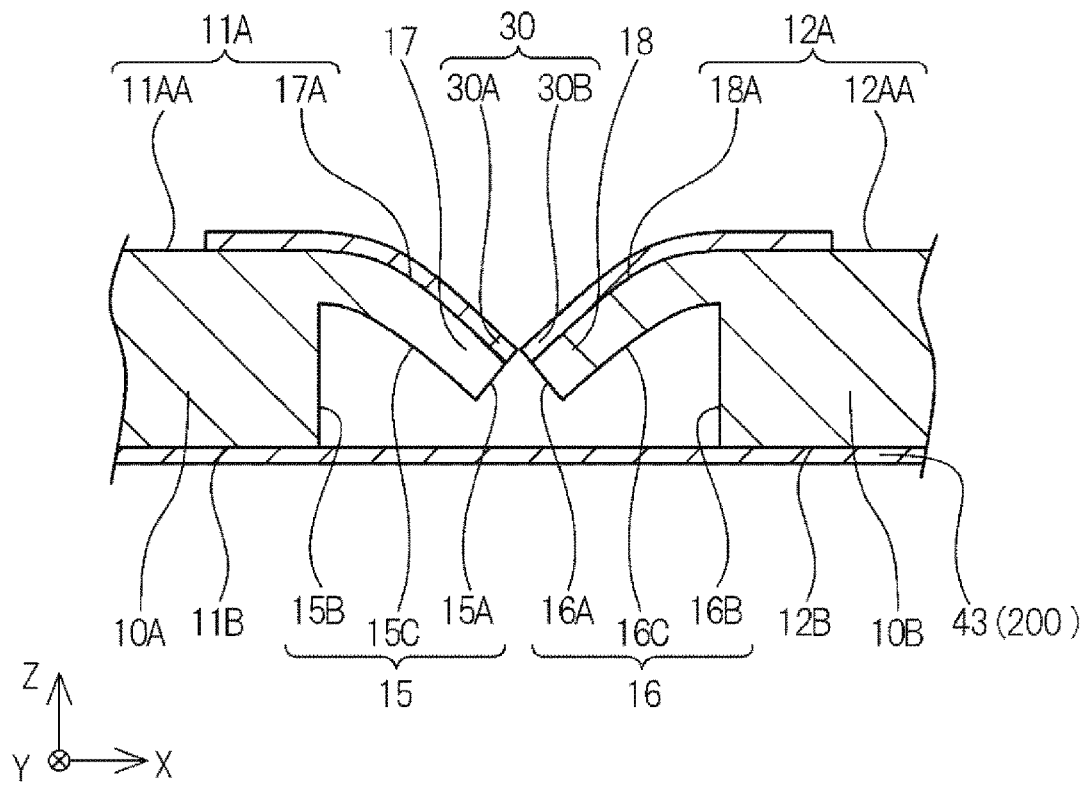
FIG. 3A is a schematic cross-sectional view showing a periphery of a first side surface, a second side surface, and a first light-modulating member according to the embodiment.
Figure 3B:
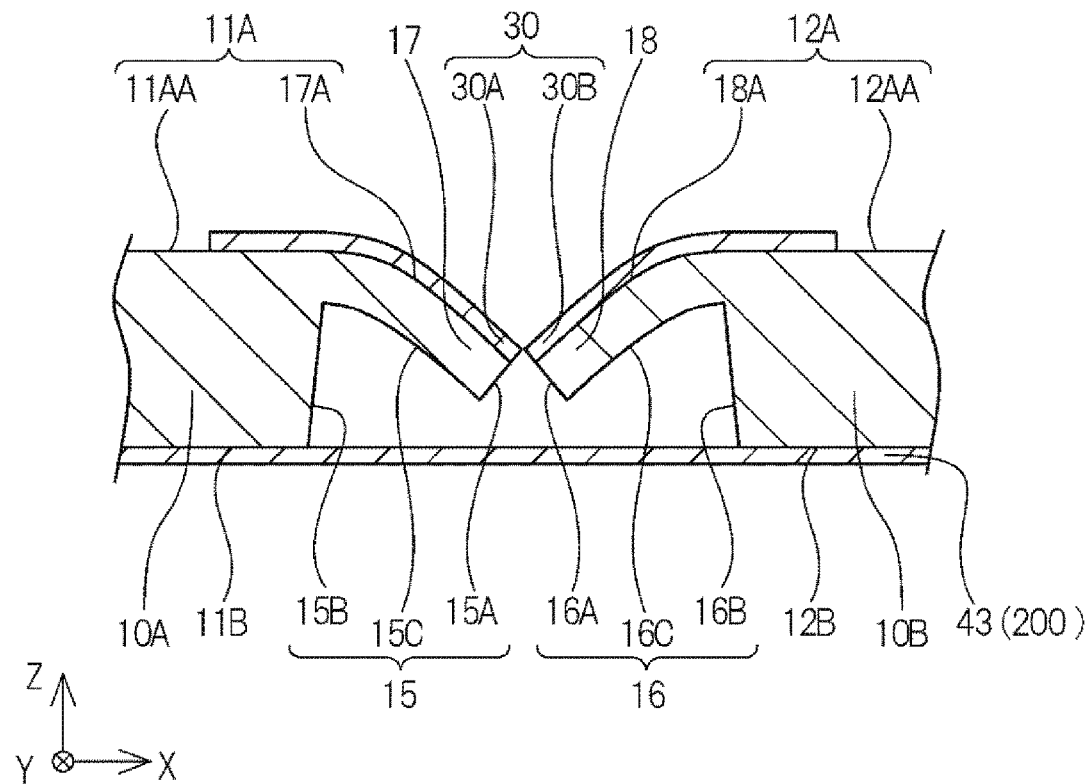
FIG. 3B is a schematic cross-sectional view showing a periphery of a first side surface, a second side surface, and a first light-modulating member according to a modification of the embodiment.

As shown in FIG. 3A, the first side surface 15 may include a first A-side surface 15A, a first B-side surface 15B, and a first C-side surface 15C. The first A-side surface 15A is continuous with the first A-major surface 11A. The first B-side surface 15B is continuous with the first B-major surface 11B. The first C-side surface 15C is positioned between the first A-side surface 15A and the first B-side surface 15B. The first C-side surface 15C is continuous with the first A-side surface 15A and the first B-side surface 15B. The first A-side surface 15A is positioned between the second side surface 16 of the second light guide part 10B and the first B-side surface 15B with respect to the X-direction. When viewed in cross-section, the first A-side surface 15A, the first B-side surface 15B, and the first C-side surface 15C may be straight lines, may be curves, or may include unevennesses. The first B-side surface 15B may be parallel to the third direction (the Z-direction) as shown in FIG. 3A, or the first B-side surface 15B may be tilted with respect to the third direction (the Z-direction) as shown in FIG. 3B. As shown in FIG. 3B, it is preferable for the first B-side surface 15B to be tilted with respect to the third direction (the Z-direction) so that the length from the upper side of the first B-side surface 15B to the second light guide part 10B in the first direction (the X-direction) is less than the length from the lower side of the first B-side surface 15B to the second light guide part 10B in the first direction (the X-direction). Thereby, a portion of the light that is emitted from the first light source 20A and travels in the +X direction is more easily converted into light that is refracted by the first B-side surface 15B and travels in the +Z direction. The light that is emitted from the first A-major surface 11A that is the light-emitting surface can be increased thereby. It is preferable for the angle between the first direction (the X-direction) and the first B-side surface 15B to be, for example, not less than 70° and not more than 88°, and more favorably not less than 80° and not more than 85°.

As shown in FIG. 3A, the first light guide part 10A may include a first protrusion 17 that includes the first A-side surface 15A, the first C-side surface 15C, and a portion of the first A-major surface 11A. The surface that is positioned at the side opposite to the first C-side surface 15C is the portion of the first A-major surface 11A, and is a portion of the first protrusion 17. The surface that is positioned at the side opposite to the first C-side surface 15C may be called a first protrusion upper surface 17A. The first protrusion 17 includes the first protrusion upper surface 17A. The portion of the first A-major surface 11A that does not include the first protrusion upper surface 17A may be called a first AA-major surface 11AA. The first protrusion upper surface 17A may be parallel to the first direction (the X-direction) or may be tilted with respect to the first direction (the X-direction). For example, it is preferable for the first protrusion upper surface 17A to be tilted to be positioned lower than the first AA-major surface 11AA. Thereby, a portion of the light that is emitted from the first light source 20A and travels in the +X direction can be refracted or reflected by the tilt of the first protrusion upper surface 17A. Thereby, the uneven luminance at the vicinity of the first side surface 15 is more easily reduced because the amount of the light that is emitted from the vicinity of the first side surface 15 can be modulated. Also, by positioning the first protrusion upper surface 17A lower than the first AA-major surface 11AA, the light-emitting module 100 is more easily downsized in the third direction (the Z-direction) than when the first protrusion upper surface 17A is positioned higher than the first AA-major surface 11AA.

As shown in FIG. 2, it is preferable for at least a portion of the first A-major surface 11A to overlap the first light source 20A in the first direction (the X-direction) when viewed in cross-section. For example, it is preferable for the first light source 20A and the first AA-major surface 11AA that is a portion of the first A-major surface 11A to overlap in the first direction (the X-direction) when viewed in cross-section. Thereby, the light that is emitted from the first light source 20A and travels in the X-direction easily strikes the first A-major surface 11A. The light that is emitted from the first A-major surface 11A that is the light-emitting surface can be increased thereby.

It is preferable for the side surface of the first light guide part 10A to have a shape similar to the first side surface 15 also at the side surfaces other than the side surface that faces the second side surface of the second light guide part. Thereby, uneven luminance is more easily reduced also at the vicinity of the side surfaces of the first light guide part 10A other than the first side surface 15.

As shown in FIG. 2, the second light guide part 10B includes the second A-major surface 12A that is used as the light-emitting surface of the planar light source 300, and the second B-major surface 12B that is positioned at the side opposite to the second A-major surface 12A. The second light guide part 10B includes the second side surface 16 that is positioned between the second A-major surface 12A and the second B-major surface 12B. The second side surface 16 is continuous with the second A-major surface 12A and the second B-major surface 12B. When viewed in cross-section, the second side surface 16 may be a straight line, may be a curve, or may include an unevenness.

As shown in FIG. 3A, the second side surface 16 may include a second A-side surface 16A, a second B-side surface 16B, and a second C-side surface 16C. The second A-side surface 16A is continuous with the second A-major surface 12A. The second B-side surface 16B is continuous with the second B-major surface 12B. The second C-side surface 16C is positioned between the second A-side surface 16A and the second B-side surface 16B. The second A-side surface 16A is between the first side surface 15 of the first light guide part 10A and the second B-side surface 16B. The second A-side surface 16A faces the first A-side surface 15A. The second B-side surface 16B faces the first B-side surface 15B. The distance between the first A-side surface 15A and the second A-side surface 16A is less than the distance between the first B-side surface 15B and the second B-side surface 16B. The distance between the first A-side surface 15A and the second A-side surface 16A means the shortest distance between the first A-side surface 15A and the second A-side surface 16A. The distance between the first B-side surface 15B and the second B-side surface 16B means the shortest distance between the first B-side surface 15B and the second B-side surface 16B. When viewed in cross-section, the second A-side surface 16A, the second B-side surface 16B, and the second C-side surface 16C may be straight lines, may be curves, or may include unevennesses. The second B-side surface 16B may be parallel to the third direction (the Z-direction) as shown in FIG. 3A; and the second B-side surface 16B may be tilted with respect to the third direction (the Z-direction) as shown in FIG. 3B. As shown in FIG. 3B, it is preferable for the second B-side surface 16B to be tilted with respect to the third direction (the Z-direction) so that the length from the upper side of the second B-side surface 16B to the first light guide part 10A in the first direction (the X-direction) is less than the length from the lower side of the second B-side surface 16B to the first light guide part 10A in the first direction (the X-direction). Thereby, a portion of the light that is emitted from the second light source 20B and travels in the −X direction is refracted by the second B-side surface 16B and is more easily converted into light that travels in the +Z direction. The light that is emitted from the second A-major surface 12A that is the light-emitting surface can be increased thereby.

As shown in FIG. 3A, the second light guide part 10B may include a second protrusion 18 that includes the second A-side surface 16A, the second C-side surface 16C, and a portion of the second A-major surface 12A. The surface that is positioned at the side opposite to the second C-side surface 16C is the portion of the second A-major surface 12A, and is a portion of the second protrusion 18. The surface that is positioned at the side opposite to the second C-side surface 16C may be called a second protrusion upper surface 18A. The second protrusion 18 includes the second protrusion upper surface 18A. The portion of the second A-major surface 12A that does not include the second protrusion upper surface 18A may be called a second AA-major surface 12AA. The second protrusion upper surface 18A may be parallel to the first direction (the X-direction) or may be tilted with respect to the first direction (the X-direction). For example, it is preferable for the second protrusion upper surface 18A to be tilted to be positioned lower than the second AA-major surface 12AA. Thereby, a portion of the light that is emitted from the second light source 20B and travels in the −X direction can be refracted or reflected by the tilt of the second protrusion upper surface 18A. Thereby, uneven luminance at the vicinity of the second side surface 16 is more easily reduced because the amount of the light that is emitted from the vicinity of the second side surface 16 can be modulated. Also, by positioning the second protrusion upper surface 18A lower than the second AA-major surface 12AA, the light-emitting module is more easily downsized in the third direction (the Z-direction) than when the second protrusion upper surface 18A is positioned higher than the second AA-major surface 12AA.

As shown in FIG. 2, it is preferable for at least a portion of the second A-major surface 12A to overlap the second light source 20B in the first direction (the X-direction) when viewed in cross-section. For example, it is preferable for the second AA-major surface 12AA that is the portion of the second A-major surface 12A to overlap the second light source 20B in the first direction (the X-direction) when viewed in cross-section. Thereby, the light that is emitted from the second light source 20B and travels in the X-direction easily strikes the second A-major surface 12A. The light that is emitted from the second A-major surface 12A that is the light-emitting surface can be increased thereby.

The first light guide part 10A includes the first hole portion 13A in which the first light source 20A is disposed. The second light guide part 10B includes the second hole portion 13B in which the second light source 20B is disposed. The first hole portion 13A may be a through-hole that extends through from the first A-major surface 11A to the first B-major surface 11B, or may be a recess that is open only at the first B-major surface 11B side. When the first hole portion 13A is a recess, the first hole portion 13A includes a bottom surface that is formed of the first light guide part 10A. The second hole portion 13B may be a through-hole that extends through from the second A-major surface 12A to the second B-major surface 12B, or may be a recess that is open only at the second B-major surface 12B side. When the second hole portion 13B is a recess, the second hole portion 13B includes a bottom surface that is formed of the second light guide part 10B. The third hole portion 13C and the fourth hole portion 13D have structures similar to that of the first hole portion 13A; and a description is therefore omitted as appropriate. The first hole portion 13A, the second hole portion 13B, the third hole portion 13C, and the fourth hole portion 13D may be called a hole portion 13.

As shown in FIG. 1, the hole portion 13 can be, for example, circular when viewed in top-view. Also, the hole portion 13 can be, for example, an ellipse or a polygon such as a triangle, a rectangle, a hexagon, an octagon, etc., when viewed in top-view.

Light Source Part 20

Figure 4:
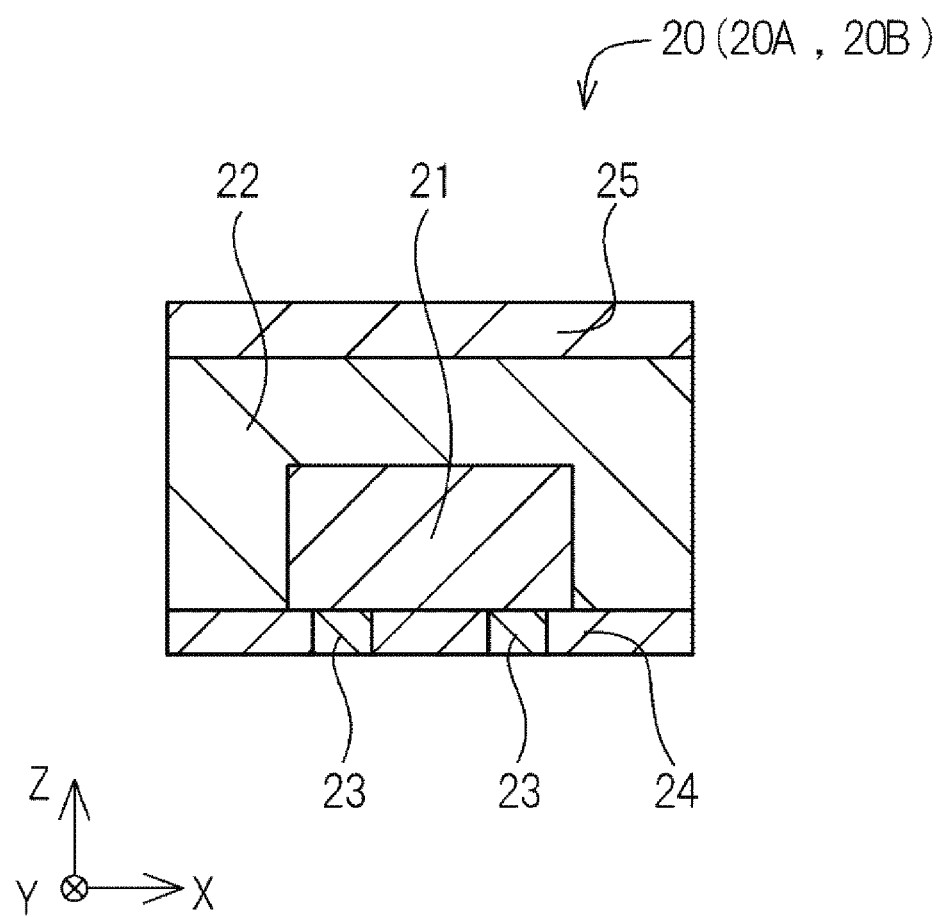
FIG. 4 is a schematic cross-sectional view showing a light source part according to the embodiment.

The light source part 20 includes the first light source 20A and the second light source 20B. The light source part 20 may further include the third light source 20C and the fourth light source 20D. The third light source 20C and the fourth light source 20D have structures similar to that of the first light source 20A; and a description is therefore omitted as appropriate. The first light source 20A is disposed in the first hole portion 13A. The second light source 20B is disposed in the second hole portion 13B. As shown in FIG. 4, the light source part 20 includes a pair of positive and negative electrodes 23. The first light source 20A and the second light source 20B may be single light-emitting elements, or may have structures in which, for example, light-transmitting members or the like are combined with light-emitting elements. According to the embodiment as shown in FIG. 4, the first light source 20A and the second light source 20B each include a light-emitting element 21, a first light-transmitting member 22, the electrodes 23, a cover member 24 and a second light-modulating member 25. The first light source 20A and the second light source 20B may include only one of the cover member 24 or the second light-modulating member 25 according to the desired light distribution. For example, the second light-modulating member 25 may not be located on the first light-transmitting member 22. In other words, the upper surface of the first light-transmitting member 22 may be used as the upper surfaces of the first and second light sources 20A and 20B. The cover member 24 may not be located under the first light-transmitting member 22. In other words, the lower surface of the first light-transmitting member 22 and the lower surface of the light-emitting element 21 may be used as the lower surfaces of the first and second light sources 20A and 20B.

The light-emitting element 21 includes a semiconductor stacked body. The semiconductor stacked body includes, for example, a support substrate of sapphire, gallium nitride, or the like, an n-type semiconductor layer and a p-type semiconductor layer located on the support substrate, a light-emitting layer sandwiched between the n-type semiconductor layer and the p-type semiconductor layer, and an n-side surface electrode and a p-side surface electrode that are electrically connected respectively to the n-type semiconductor layer and the p-type semiconductor layer. The semiconductor stacked body may not include the support substrate. The structure of the light-emitting layer may be a structure that has a single active layer such as a double heterostructure or single quantum well structure (SQW), or may be a structure that has one active layer group such as a multi-quantum well structure (MQW). The light-emitting layer can emit visible light or ultraviolet light. The light-emitting layer can emit blue to red light as the visible light. For example, $In_xAl_yGa_{1-x-y}N$ ($0 \leq x$, $0 \leq y$, and $x+y \leq 1$) can be included as the semiconductor stacked body that includes such a light-emitting layer. The semiconductor stacked body can include at least one light-emitting layer that can emit the light emission colors described above. For example, the semiconductor stacked body may have a structure that includes at least one light-emitting layer between the n-type semiconductor layer and the p-type semiconductor layer, or may have a configuration in which a structure that includes the n-type semiconductor layer, the light-emitting layer, and the p-type semiconductor layer in this order is repeated multiple times. When the semiconductor stacked body includes multiple light-emitting layers, light-emitting layers of different light emission colors may be included, or light-emitting layers of the same light emission color may be included. The light emission color being the same means being in a range that can be considered to be the same light emission color in use; for example, there may be fluctuation of about ±10 nm of the dominant wavelength. A combination of the light emission colors can be appropriately selected; for example, when the semiconductor stacked body includes two light-emitting layers, examples of combinations of the light emission colors include blue light and blue light, green light and green light, red light and red light, ultraviolet light and ultraviolet light, blue light and green light, blue light and red light, green light and red light, etc. Also, the light-emitting layer may include multiple active layers of different light emission colors, or may include multiple active layers of the same light emission color.

The first light-transmitting member 22 covers the upper surface and/or side surface of the light-emitting element 21. The first light-transmitting member 22 includes the functions of protecting the light-emitting element 21 and performing wavelength conversion, light diffusion, and the like according to the particles added to the first light-transmitting member 22. Specifically, the first light-transmitting member 22 may include a light-transmitting resin, and may further include a fluorescer. For example, a silicone resin, an epoxy resin, etc., can be used as the light-transmitting resin. An yttrium-aluminum-garnet-based fluorescer (e.g., $Y_3(Al, Ga)_6O_{12}:Ce$), a lutetium-aluminum-garnet-based fluorescer (e.g., $Lu_3(Al, Ga)_6O_{12}:Ce$), a terbium-aluminum-garnet-based fluorescer (e.g., $Tb_3(Al, Ga)_5O_{12}:Ce$), a nitride-based fluorescer such as a β-sialon fluorescer (e.g., $(Si, Al)_3(O, N)_4:Eu$), an a-sialon fluorescer (e.g., $M_z(Si, Al)_{12}(O, N)_{16}$ (however, $0 < z \leq 2$, and M is a lanthanide element other than Li, Mg, Ca, Y, La, and Ce)), a CASN-based fluorescer (e.g., $CaAlSiN_3:Eu$), a SCASN-based fluorescer (e.g., $(Sr, Ca)AlSiN_3:Eu$), or the like, a fluoride-based fluorescer such as a KSF-based fluorescer (e.g., $K_2SiF_6:Mn$), a MGF-based fluorescer (e.g., $3.5MgO.0.5MgF_2.GeO_2:Mn$), or the like, a quantum dot fluorescer, etc., can be used as the fluorescer. One type of fluorescer or multiple types of fluorescers may be used as the fluorescer added to the first light-transmitting member 22.

The cover member 24 is reflective to the light emitted by the light-emitting element 21 and is located at least at the lower surface of the light-emitting element 21. It is preferable for the reflectance of the cover member 24 for the peak wavelength of the light-emitting element 21 to be, for example, not less than 60%, and more favorably not less than 70%. By providing the cover member 24 at the lower surface of the light-emitting element 21, the absorption by the support member 200 of the light from the light-emitting element 21 can be suppressed. It is preferable for the reflectance of the cover member 24 for the peak wavelength of the light-emitting element 21 to be greater than the reflectance of the first light-modulating member 30 for the peak wavelength of the light-emitting element 21. By setting the reflectance of the cover member 24 to be high, the absorption by the support member 200 of the light from the light-emitting element 21 is more easily suppressed. At least portions of the electrodes 23 connected respectively to the p-side surface electrode and the n-side surface electrode of the light-emitting element 21 are exposed from under the cover member 24. Thereby, electricity can be supplied from the electrodes 23 to the light-emitting element 21. It is preferable for the cover member 24 to be located also at the lower surface of the first light-transmitting member 22 that covers the side surface of the light-emitting element 21. Thereby, the absorption by the support member 200 of the light from the light-emitting element 21 can be further suppressed. The thickness of the cover member 24 may be uniform or may change from the lower surface of the light-emitting element 21 to the lower surface of the first light-transmitting member 22. For example, the thickness of the cover member 24 may increase toward the electrodes 23.

The cover member 24 is, for example, a resin member that includes a light-diffusing material. Specifically, the cover member 24 is a silicone resin, an epoxy resin, or an acrylic resin that includes a light-diffusing material made of particles of $TiO_2$, $SiO_2$, $Al_2O_3$, ZnO, glass, etc.

The second light-modulating member 25 is located at the upper surface of the first light-transmitting member 22 and modulates the amount and/or emission direction of the light emitted from the upper surface of the first light-transmitting member 22. The second light-modulating member 25 is reflective and transmissive to the light emitted by the light-emitting element 21. A portion of the light that is emitted from the upper surface of the first light-transmitting member 22 is reflected by the second light-modulating member 25; and another portion passes through the second light-modulating member 25. It is preferable for the transmittance of the second light-modulating member 25 for the peak wavelength of the light-emitting element 21 to be, for example, not less than 1% and not more than 50%, and more favorably not less than 3% and not more than 30%. The luminance directly above the light-emitting element 21 can be reduced thereby, and the luminance of the region directly above the light-emitting element 21 can be prevented from becoming greater than the luminance of the other regions. It is preferable for the reflectance of the second light-modulating member 25 for the peak wavelength of the light-emitting element 21 to be less than the reflectance of the cover member 24 for the peak wavelength of the light-emitting element 21. Thereby, a portion of the light that is emitted from the upper surface of the first light-transmitting member 22 more easily passes through the second light-modulating member 25; therefore, the region directly above the light-emitting element 21 can be prevented from becoming too dark. The second light-modulating member 25 can include a light-transmitting resin, a light-diffusing material that is included in the light-transmitting resin, etc. The light-transmitting resin is, for example, a silicone resin, an epoxy resin, or an acrylic resin. For example, particles of $TiO_2$, $SiO_2$, $Al_2O_3$, ZnO, glass, etc., are examples of the light-diffusing material. The second light-modulating member 25 may be, for example, a metal member of Al, Ag, or the like, or a dielectric multilayer film.

Figure 5:
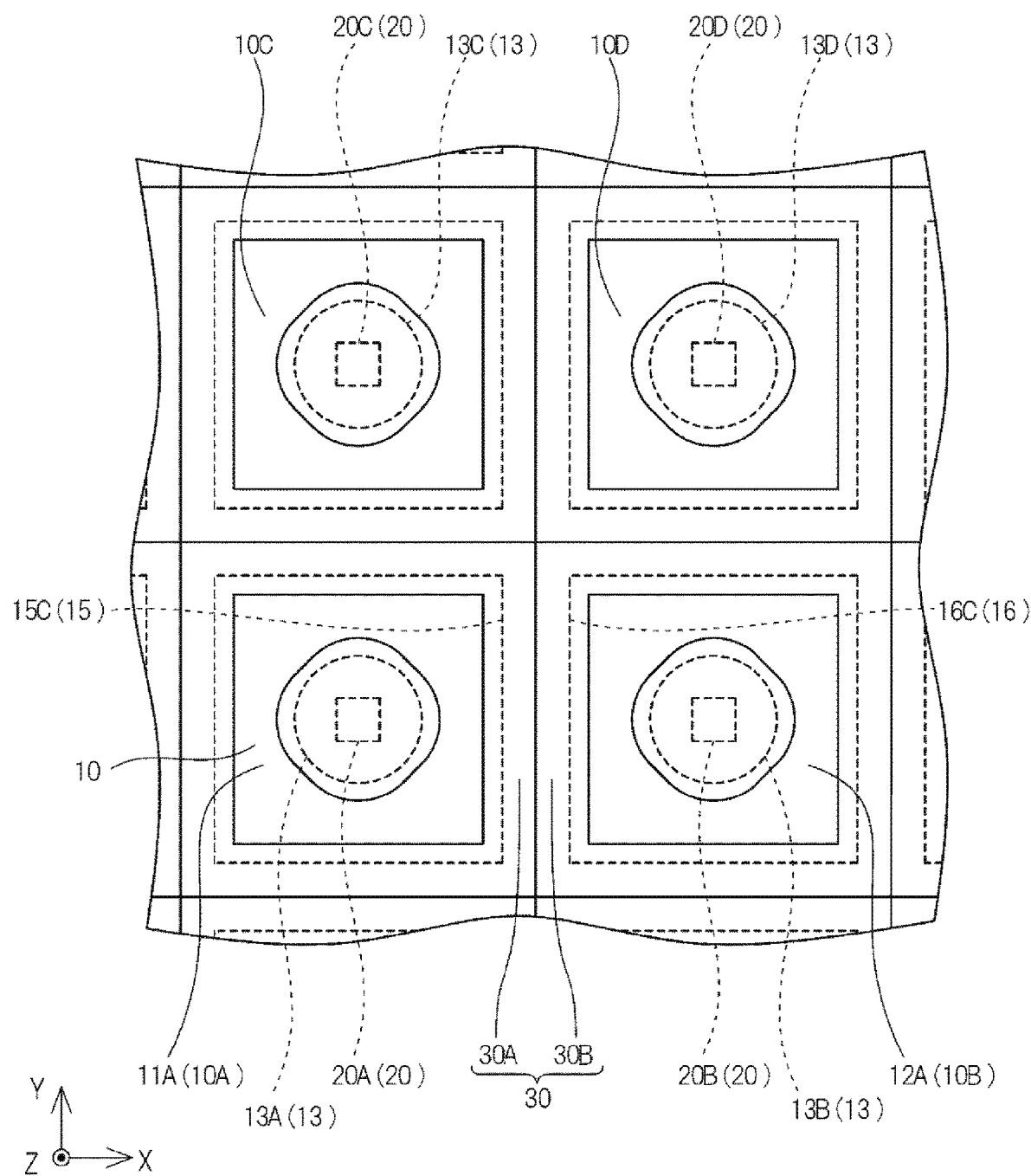
FIG. 5 is a schematic top view showing a planar light source according to a modification of the embodiment.

Although the shape of the light source part 20 is not particularly limited, the shape of the light source part 20 of the embodiment is a rectangular prism. When viewed in top-view, the shape of the light source part 20 may be a polygon such as a triangle, a rectangle, a hexagon, an octagon, etc. When the shape of the light source part 20 when viewed in top-view is a rectangle as shown in FIG. 1, each side (side surface) of the light source part 20 may be non-parallel to the first direction (the X-direction) or the second direction (the Y-direction), or each side (side surface) of the light source part 20 may be parallel to the first direction (the X-direction) or the second direction (the Y-direction) as shown in FIG. 5. As shown in FIG. 1, it is preferable for each side (side surface) of the first light source 20A to have an angle of +45 degrees or 135 degrees (−45 degrees) with respect to the first direction (the X-direction) or the second direction (the Y-direction). Thereby, the side surfaces of the first light source 20A more easily face the corners of the first light guide part 10A. Thereby, the reduction of the luminance at the corner vicinity of the first light guide part 10A can be reduced.

First Light-Modulating Member 30

Figure 7A:
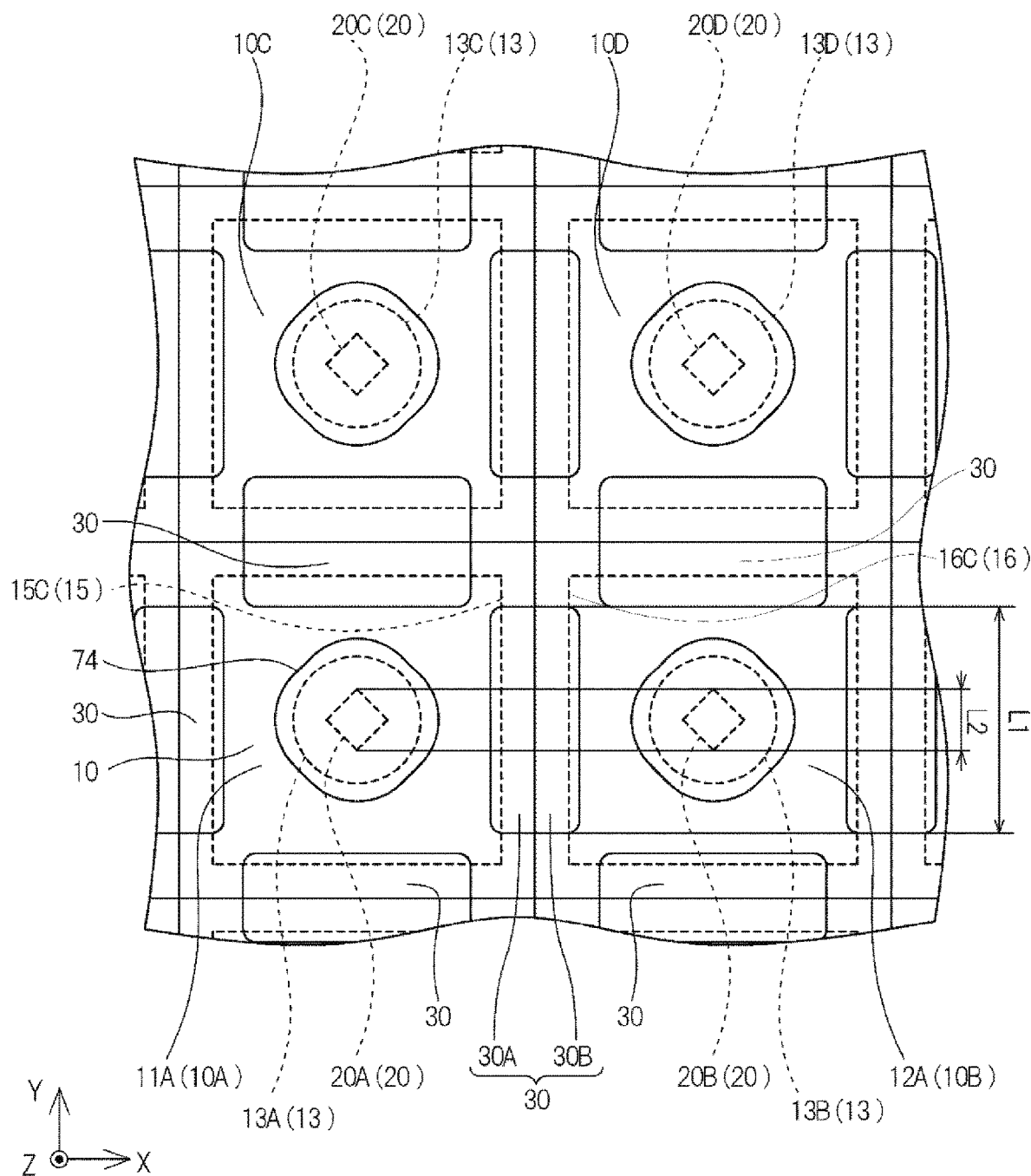
FIG. 7A is a schematic top view showing a planar light source according to a modification of the embodiment.
Figure 7B:
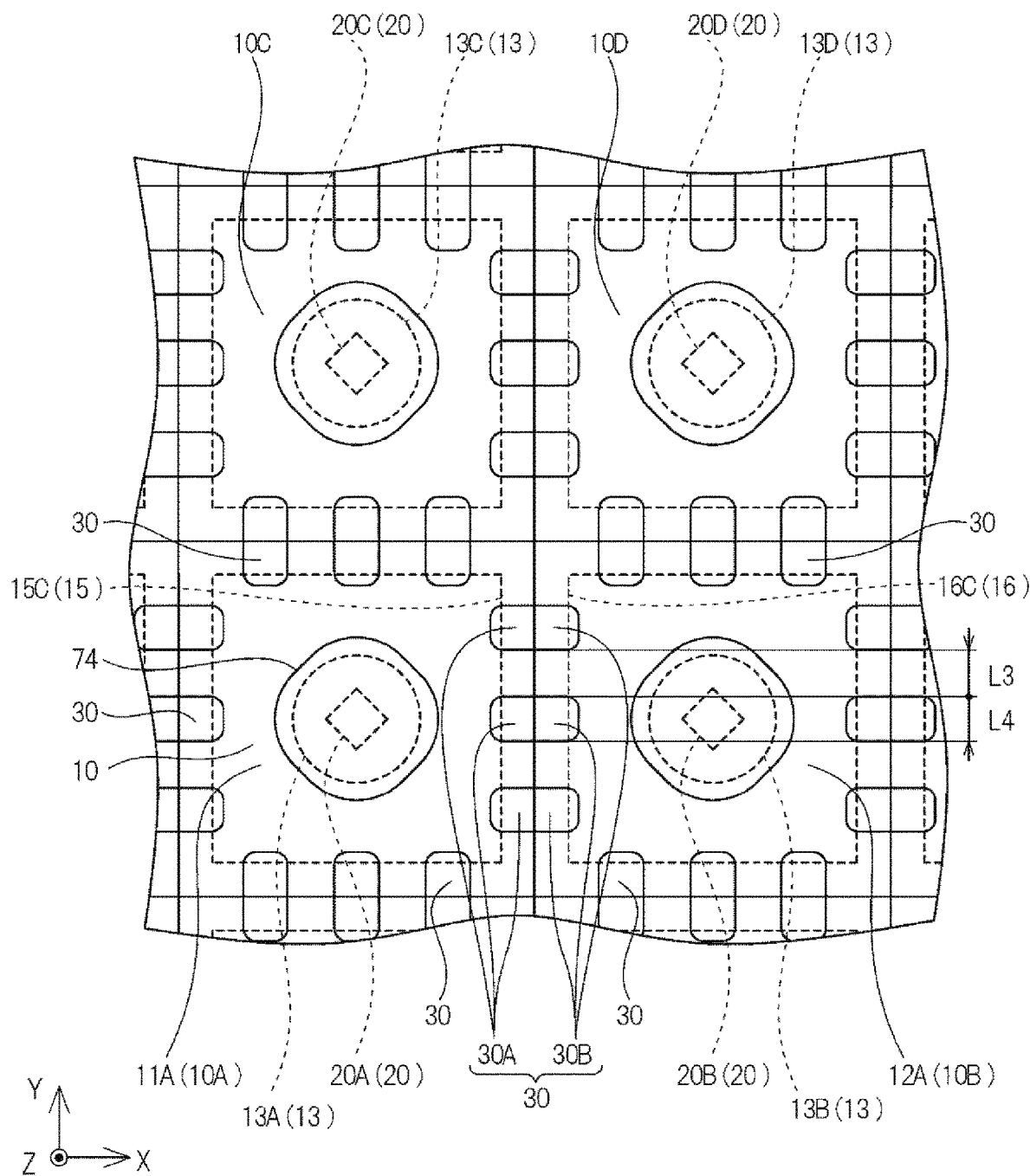
FIG. 7B is a schematic top view showing a planar light source according to a modification of the embodiment.

The first light-modulating member 30 is a member that modulates the amount and/or emission direction of the light emitted from the light guide member 10. The first light-modulating member 30 is reflective and transmissive to the light emitted by the light-emitting element 21. Also, the first light-modulating member 30 may modulate the amount of the light emitted from the light guide member 10 by absorbing the light emitted by the light-emitting element 21. The first light-modulating member 30 is positioned at the upper side of the first A-major surface 11A and overlaps the first A-major surface 11A and the first side surface 15 when viewed in top-view. The first light-modulating member 30 may include a single layer in the third direction or may include a stacked body of multiple layers. The number of the first light-modulating members 30 that overlap the first A-major surface 11A and the first side surface 15 when viewed in top-view may be one as shown in FIGS. 1 and 7A or multiple as shown in FIG. 7B. A portion of the light that is emitted from the first A-major surface 11A or the first side surface 15 is reflected by the first light-modulating member 30; and another portion passes through the first light-modulating member 30. It is preferable for the transmittance of the first light-modulating member 30 for the peak wavelength of the light source part 20 to be, for example, not less than 1% and not more than 50%, and more favorably not less than 3% and not more than 30%. Thereby, the uneven luminance of the light-emitting module can be reduced because the amount of the light that is emitted from the vicinity of the first side surface 15 of the first light guide part 10A can be modulated. Although the thickness of the first light-modulating member 30 is not particularly limited, it is preferable to be, for example, not less than 0.005 mm and not more than 0.2 mm, and more favorably not less than 0.01 mm and not more than 0.075 mm.

It is preferable for the first light-modulating member 30 to be a resin member that includes a light-diffusing material. Thereby, the amount of the light that is emitted from the light guide member 10 can be easily modulated by adjusting the concentration of the light-diffusing material included in the first light-modulating member 30. A material similar to that of the second light-modulating member 25 can be used as the material of the first light-modulating member 30.

It is sufficient for the first light-modulating member 30 to overlap at least a portion of the first side surface 15 when viewed in top-view. For example, when the first side surface 15 includes the first A-side surface 15A and the first B-side surface 15B, the first light-modulating member 30 may be separated from the first A-side surface 15A and may overlap the first B-side surface 15B when viewed in top-view, or the first light-modulating member 30 may overlap the first A-side surface 15A and may be separated from the first B-side surface 15B when viewed in top-view. The amount of the light that is emitted from the vicinity of the first side surface 15 can be modulated by the first light-modulating member 30 overlapping at least a portion of the first side surface 15 when viewed in top-view. The light from the first light source 20A easily strikes the first B-side surface 15B because the distance from the first B-side surface 15B to the first light source 20A is less than the distance from the first A-side surface 15A to the first light source 20A. Therefore, the uneven luminance of the light-emitting module 100 is more easily reduced by the first light-modulating member 30 and the first B-side surface 15B overlapping when viewed in top-view.

It is preferable for the first light-modulating member 30 to be separated from the first light source 20A when viewed in top-view. Also, it is preferable for the first light-modulating member 30 to be separated from the first hole portion 13A when viewed in top-view. When viewed in top-view, it is preferable for the first light-modulating member 30 to be separated from a third light-modulating member 74 described below. The light that is emitted from the first A-major surface 11A that is the light-emitting surface can be increased thereby.

It is preferable for the portion of the first side surface 15 that overlaps the first light source 20A in the first direction (the X-direction) when viewed in cross-section and the first light-modulating member 30 to overlap when viewed in top-view. For example, as shown in FIG. 2, when the first light source 20A and the first B-side surface 15B overlap in the first direction (the X-direction), it is preferable for the first light-modulating member 30 and the first B-side surface 15B to overlap when viewed in top-view. The light that is emitted from the first light source 20A and travels in the X-direction easily strikes the portion of the first side surface 15 (the first B-side surface 15B) that overlaps the first light source 20A in the first direction (the X-direction) when viewed in cross-section. Therefore, the uneven luminance of the light-emitting module 100 is more easily reduced by the first light-modulating member 30 and the portion of the first side surface 15 (the first B-side surface 15B) that overlaps the first light source 20A in the first direction (the X-direction) to overlap each other when viewed in top-view.

Figure 6A:
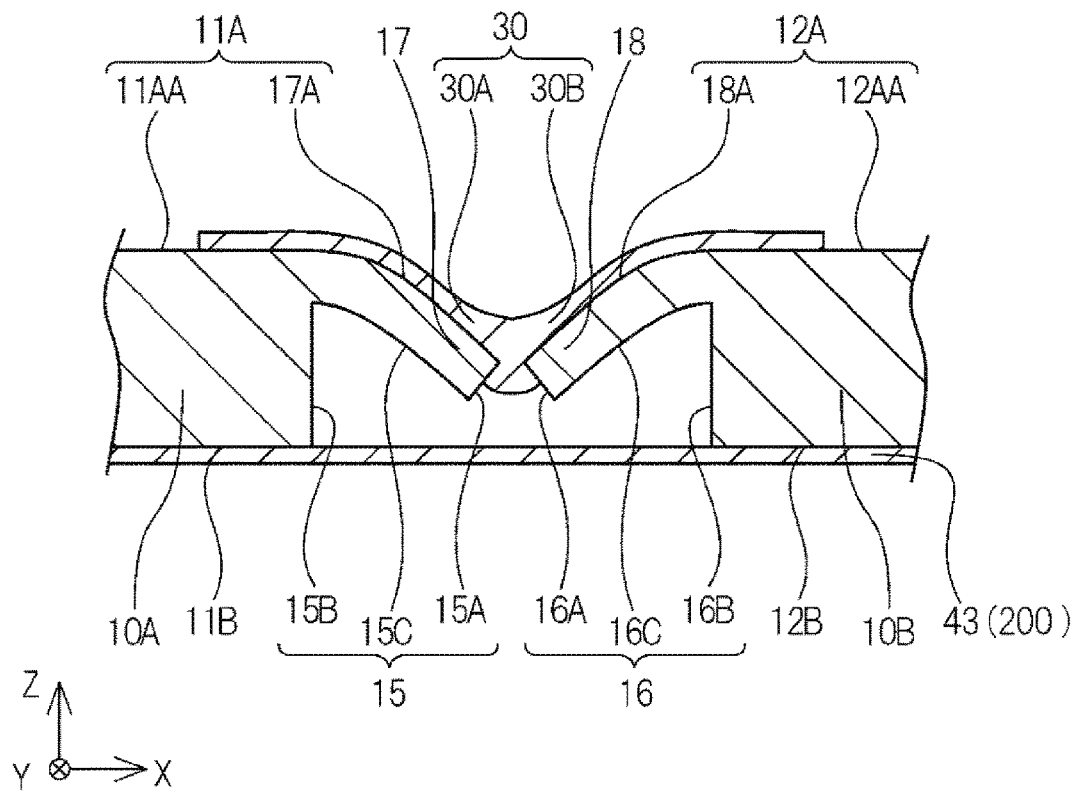
FIG. 6A is a schematic cross-sectional view showing a periphery of a first side surface, a second side surface, and a first light-modulating member according to a modification of the embodiment.

As shown in FIGS. 1 and 3A, it is preferable for the first light-modulating member 30 to be positioned at the upper side of the second A-major surface 12A and to overlap the second A-major surface 12A and the second side surface 16 when viewed in top-view. Thereby, the uneven luminance of the light-emitting module 100 can be further reduced because the amount of the light that is diffusely reflected by the second side surface 16 can be modulated. The first light-modulating member 30 that overlaps the first A-major surface 11A and the first side surface 15 when viewed in top-view may be called a first A-light-modulating member 30A; and the first light-modulating member 30 that overlaps the second A-major surface 12A and the second side surface 16 when viewed in top-view may be called a first B-light-modulating member 30B. The first A-light-modulating member 30A and the first B-light-modulating member 30B may be separate bodies as shown in FIG. 3A, or the first A-light-modulating member 30A and the first B-light-modulating member 30B may be a continuous body as shown in FIG. 6A. As shown in FIG. 6A, it is preferable for the first light-modulating member 30 to continuously cover the first A-major surface 11A and the first side surface 15 (the first A-side surface 15A). Thereby, the light that is emitted from the first A-major surface 11A and the first side surface 15 (the first A-side surface 15A) is more easily modulated by the first light-modulating member 30.

Figure 6B:
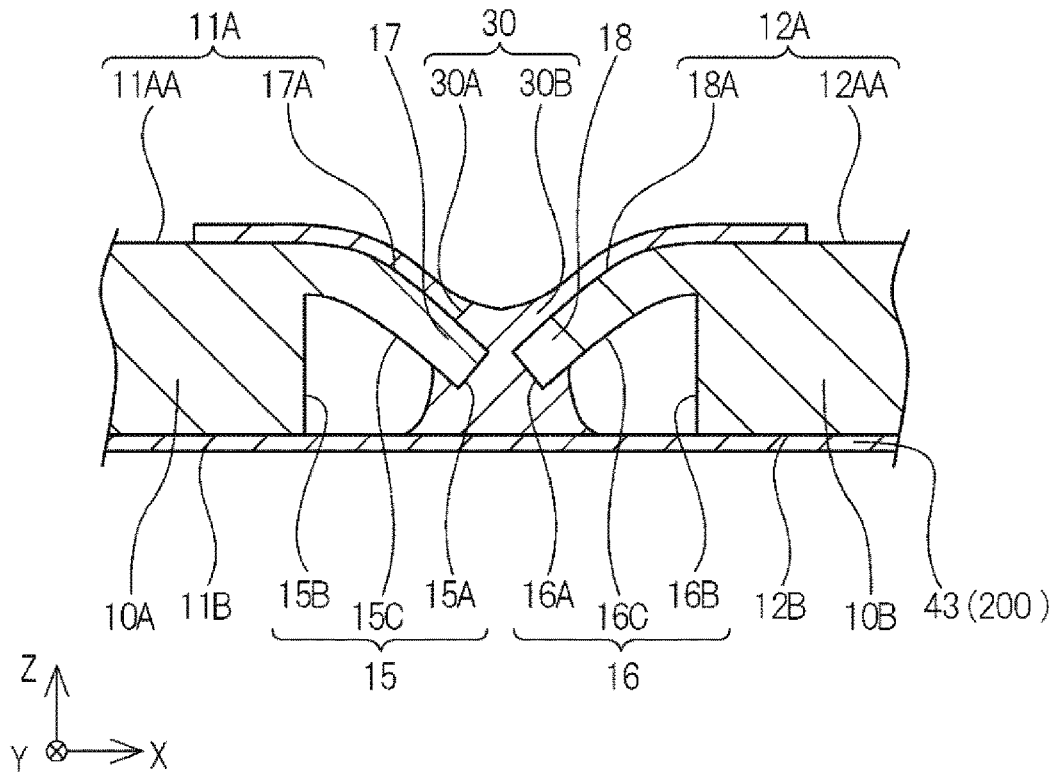
FIG. 6B is a schematic cross-sectional view showing a periphery of a first side surface, a second side surface, and a first light-modulating member according to a modification of the embodiment.

It is preferable for a portion of the first light-modulating member 30 to be positioned lower than the upper surface of the first light source 20A. Thereby, a portion of the light that is emitted from the first light source 20A and travels in the +X direction is easily reflected or refracted by the first light-modulating member 30. Thereby, the penetration into the second light guide part 10B of the light that is emitted from the first light source 20A and travels in the +X direction can be suppressed. Therefore, the contrast between the first light guide part 10A and the second light guide part 10B when the first light source 20A is lit and the second light source 20B is not lit can be improved. As shown in FIG. 6B, the first light-modulating member 30 may contact the support member 200. Thereby, the penetration into the second light guide part 10B of the light that is emitted from the first light source 20A and travels in the +X direction can be further suppressed.

Figure 6C:
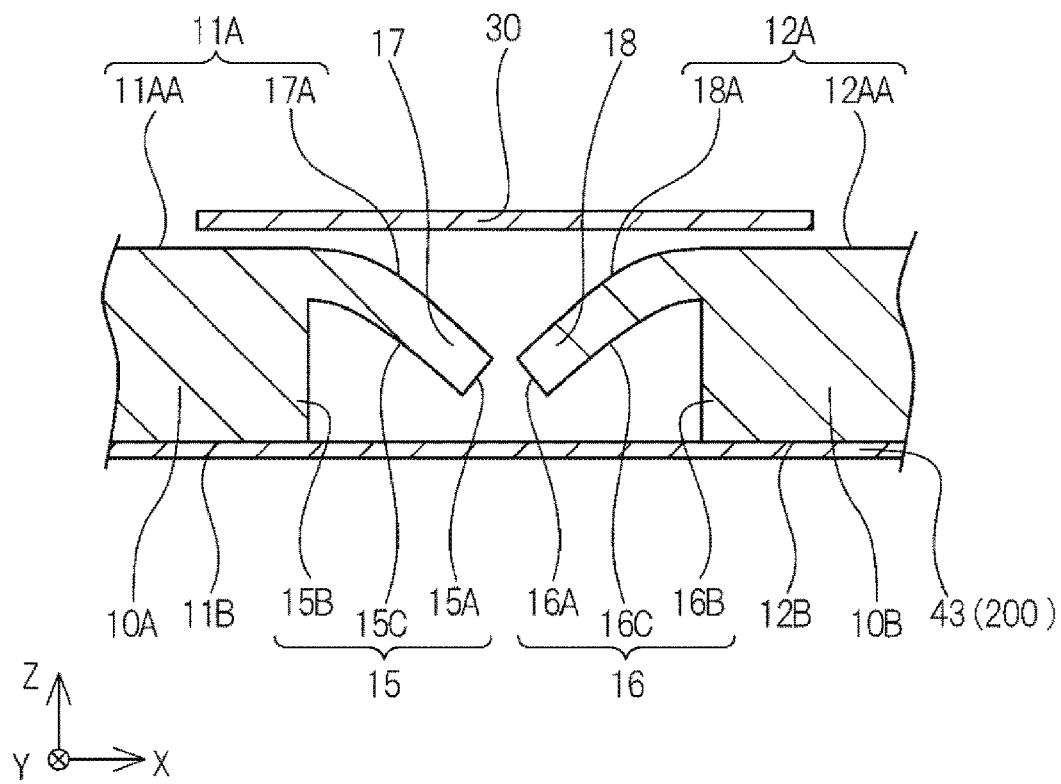
FIG. 6C is a schematic cross-sectional view showing a periphery of a first side surface, a second side surface, and a first light-modulating member according to a modification of the embodiment.
Figure 6D:
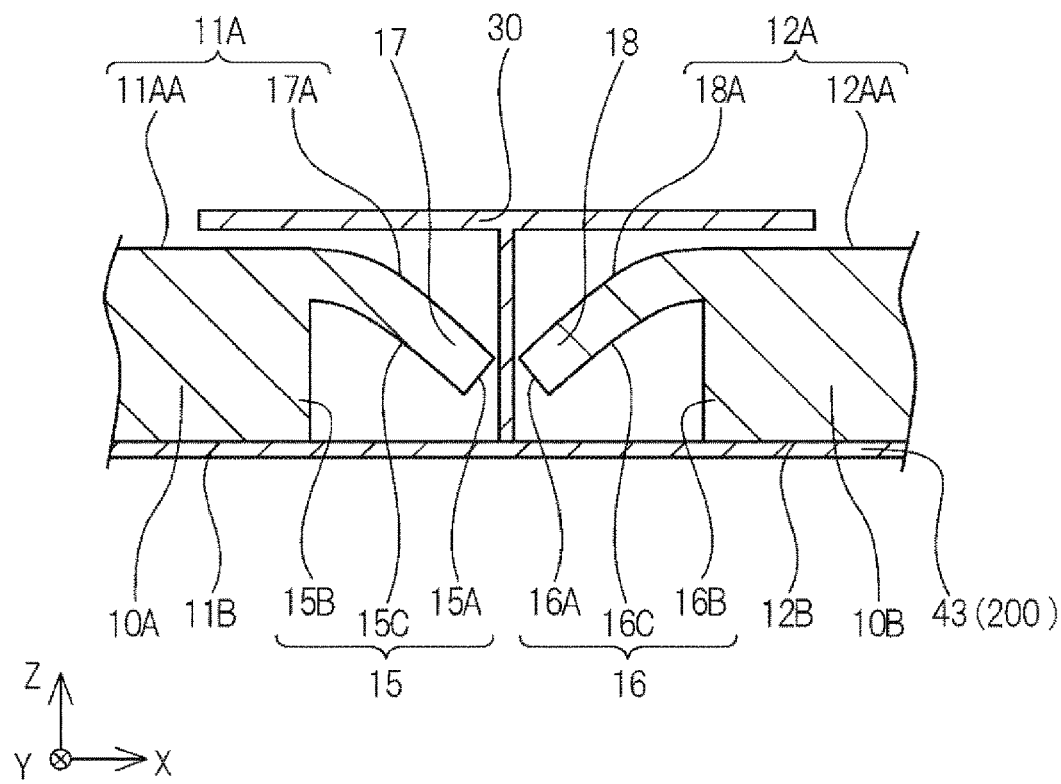
FIG. 6D is a schematic cross-sectional view showing a periphery of a first side surface, a second side surface, and a first light-modulating member according to a modification of the embodiment.

The first light-modulating member 30 may be separated from the light guide member 10 as shown in FIGS. 6C and 6D, or may contact the light guide member 10 as shown in FIG. 3A. It is preferable for the first light-modulating member 30 to contact the light guide member 10. Thereby, the light-emitting module 100 is more easily downsized in the third direction (the Z-direction). When the first light-modulating member 30 is separated from the light guide member 10, the first light-modulating member 30 can be fixed above the light guide member 10 by various methods within the limits of technical feasibility. For example, the first light-modulating member 30 may be fixed on the support member 200. Thereby, the first light-modulating member 30 can be fixed above the light guide member 10 even when the first light-modulating member 30 is separated from the light guide member 10. The first light-modulating member 30 may be fixed above the light guide member 10 via a bonding member or the like positioned between the first light-modulating member 30 and the light guide member 10. Also, the first light-modulating member 30 may be fixed to a frame body that is positioned on the support member 200 and surrounds the light guide member 10 when viewed in top-view. Thereby, the first light-modulating member 30 can be fixed above the light guide member 10 even when the first light-modulating member 30 is separated from the light guide member 10.

The first light-modulating member 30 may not overlap the first light guide part 10A in the first direction (the X-direction) as shown in FIG. 6C, and the first light-modulating member 30 may overlap the first light guide part 10A in the first direction (the X-direction) as shown in FIG. 6D. In other words, the first light-modulating member 30 may be positioned only at the upper side of the first A-major surface 11A as shown in FIG. 6C, or the first light-modulating member 30 may be positioned at the upper side and lower side of the first A-major surface 11A with respect to the third direction (the Z-direction) as shown in FIG. 6D. Because the first light-modulating member 30 overlaps the first light guide part 10A in the first direction (the X-direction) as shown in FIG. 6D, a portion of the light that is emitted from the first light source 20A and travels in the +X direction is easily reflected or refracted by the first light-modulating member 30. As shown in FIGS. 6B and 6D, the first light-modulating member may contact the support member 200. Thereby, the penetration into the second light guide part 10B of the light that is emitted from the first light source 20A and travels in the +X direction can be further suppressed.

The upper surface of the first light-modulating member 30 may be parallel to the first direction (the X-direction) as shown in FIG. 6C, and the upper surface of the first light-modulating member 30 may be tilted with respect to the first direction (the X-direction) as shown in FIG. 3A. As shown in FIG. 3A, it is preferable for the upper surface of the first light-modulating member 30 to tilt in the −Z direction from the first light source 20A side toward the second light source 20B side. Thereby, a portion of the light that is emitted from the first light source 20A and travels in the +X direction can be refracted or reflected by the tilt of the upper surface of the first light-modulating member 30. Thereby, the uneven luminance at the vicinity of the first side surface 15 is more easily reduced because the amount of the light that is emitted from the vicinity of the first side surface 15 can be modulated by the tilt of the upper surface of the first light-modulating member 30.

One first light-modulating member 30 may continuously surround the entire periphery of the first light source 20A when viewed in top-view as shown in FIG. 1, or multiple first light-modulating members 30 may surround the first light source 20A when viewed in top-view as shown in FIGS. 7A and 7B. As shown in FIGS. 1, 7A, and 7B, it is preferable for the first light source 20A and the first light-modulating member 30 to overlap in the first direction (the X-direction) when viewed in top-view. Compared to other portions, the light from the first light source 20A easily strikes the portion of the first side surface 15 that overlaps the first light source 20A in the first direction (the X-direction) because the distance from the first light source 20A to the first side surface 15 can easily be short. Therefore, because the first light source 20A and the first light-modulating member 30 overlap in the first direction (the X-direction), the amount of the light that is emitted from the portion of the first side surface 15 that overlaps the first light source 20A in the first direction (the X-direction) is more easily modulated by the first light-modulating member 30. As shown in FIG. 7A, a length L1 in the second direction (the Y-direction) of the first light-modulating member 30 that overlaps the first side surface 15 when viewed in top-view may be greater than a length L2 of the first light source 20A in the second direction (the Y-direction). Thereby, the uneven luminance is more easily reduced at the vicinity of the portion of the first side surface 15 that overlaps the first light source 20A in the first direction (the X-direction).

As shown in FIGS. 7A and 7B, when the first light guide part 10A is a polygon such as a rectangle, etc., when viewed in top-view, it is preferable for the first light-modulating member 30 to be separated from the corners of the first light guide part 10A. Thereby, the uneven luminance of the light-emitting module can be reduced because the corners of the first light guide part 10A can be prevented from becoming dark.

When the multiple first light-modulating members 30 overlap the first side surface 15 when viewed in top-view as shown in FIG. 7B, the uneven luminance at the vicinity of the first side surface 15 can be reduced by appropriately setting the distance between the first light-modulating members 30 that are next to each other. For example, a distance L3 in the second direction (the Y-direction) between the first light-modulating members 30 that are next to each other in the second direction (the Y-direction) may be greater than a length L4 of the first light-modulating member 30 in the second direction (the Y-direction). Thereby, the light that is emitted from the first A-major surface 11A that is the light-emitting surface can be increased because the surface area of the first A-major surface 11A that is exposed from under the first light-modulating member 30 is increased.

Second Light-Transmitting Member 71

Figure 8A:
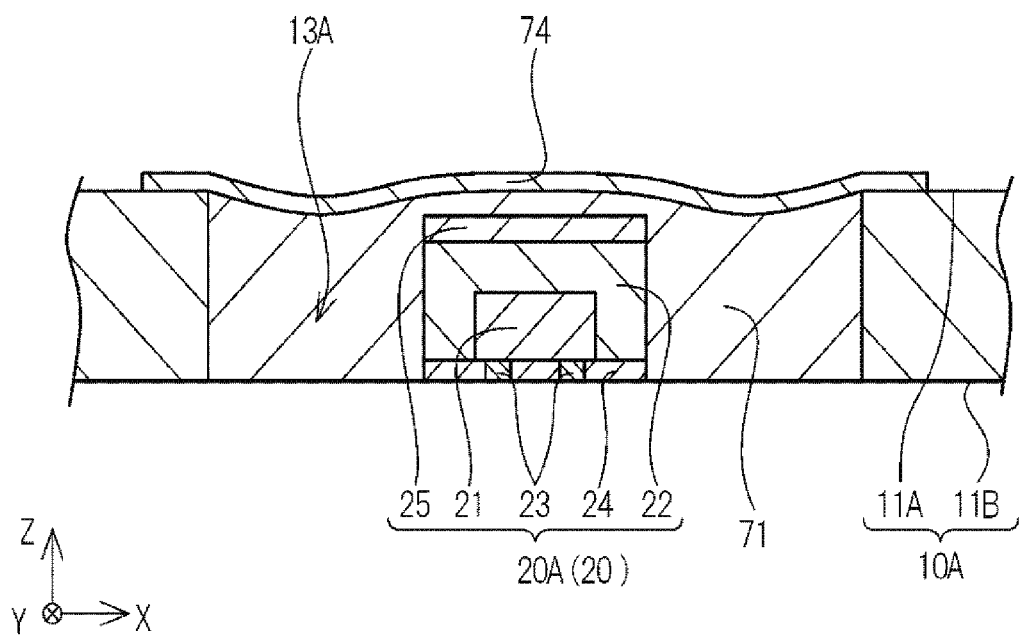
FIG. 8A is a schematic cross-sectional view showing a periphery of a light source part, a second light-transmitting member, and a third light-modulating member according to the embodiment.

As shown in FIGS. 2 and 8A, the light-emitting module 100 may further include a second light-transmitting member 71. The second light-transmitting member 71 is transmissive to the light emitted by the light source part 20. It is preferable for the transmittance of the second light-transmitting member 71 for the peak wavelength of the light source part 20 to be, for example, not less than 50%, and more favorably not less than 70%. A known material such as a resin material, etc., can be used as the material of the second light-transmitting member 71. For example, the same resin as the material of the light guide member 10 or a resin that has a small refractive index difference with the material of the light guide member 10 can be used as the material of the second light-transmitting member 71. The second light-transmitting member 71 may include a single layer in the third direction (the Z-direction) or may include a stacked body of multiple layers. The second light-transmitting member 71 may include a fluorescer and/or a light-diffusing material. When the second light-transmitting member 71 is a stacked body, the second light-transmitting member 71 may include a layer that includes a fluorescer and a layer that does not include a fluorescer.

Figure 8B:
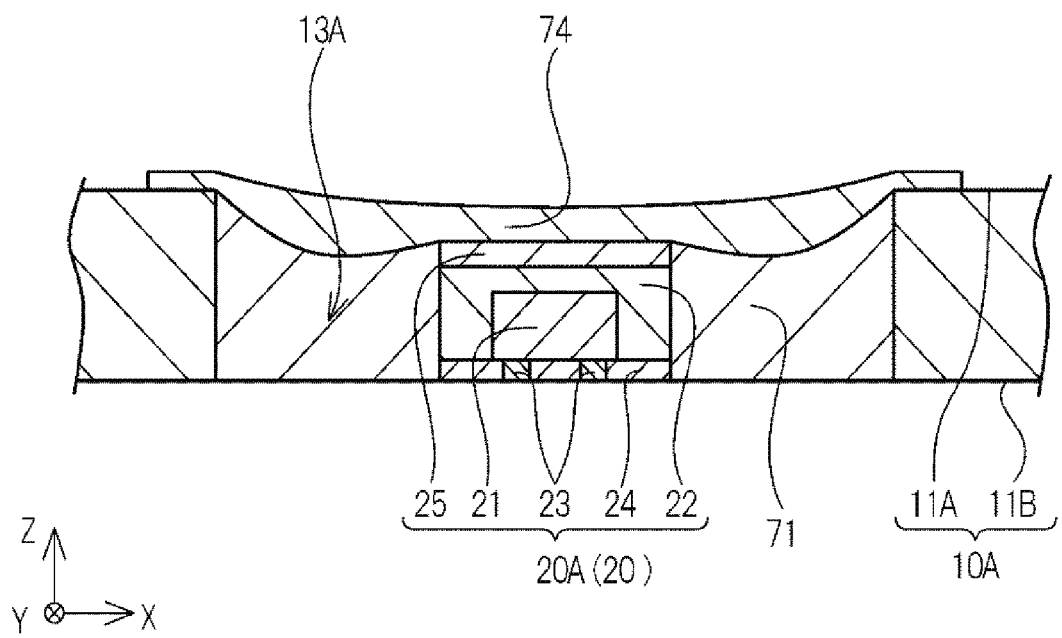
FIG. 8B is a schematic cross-sectional view showing a periphery of a light source part, a second light-transmitting member, and a third light-modulating member according to a modification of the embodiment.

The second light-transmitting member 71 is disposed in the first hole portion 13A of the first light guide part 10A and covers the side surface of the first light source 20A. The second light-transmitting member 71 may cover the side surface and upper surface of the first light source 20A as shown in FIG. 8A, or the second light-transmitting member 71 may cover the side surface of the first light source 20A and not cover the upper surface of the first light source 20A as shown in FIG. 8B. By covering the upper surface of the first light source 20A with the second light-transmitting member 71, the amount of the light directly above the first light source 20A can be modulated by the thickness of the second light-transmitting member 71 that covers the upper surface of the first light source 20A, etc. The uneven luminance of the light-emitting module 100 is more easily reduced thereby. Also, the light-emitting module is more easily downsized in the third direction (the Z-direction) by the upper surface of the first light source 20A not being covered with the second light-transmitting member 71. It is preferable for the second light-transmitting member 71 to contact the first light guide part 10A and the first light source 20A. Thereby, the light from the first light source 20A is easily guided into the first light guide part 10A.

Figure 8C:
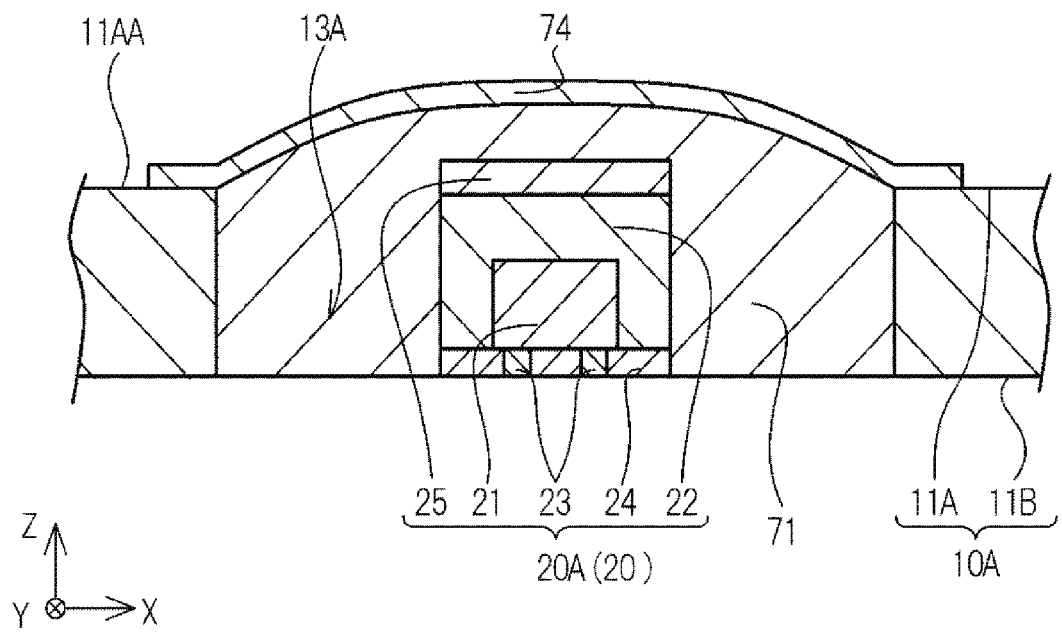
FIG. 8C is a schematic cross-sectional view showing a periphery of a light source part, a second light-transmitting member, and a third light-modulating member according to a modification of the embodiment.

The upper surface of the second light-transmitting member 71 may be a flat surface or may be a concave or convex curved surface. As shown in FIG. 8C, a portion of the second light-transmitting member 71 may be positioned higher than the highest point of the first A-major surface 11A. Thereby, the amount of the light directly above the first light source 20A is more easily modulated by the second light-transmitting member 71 because the thickness of the portion of the second light-transmitting member 71 that covers the upper surface of the first light source 20A can be thick.

Third Light-Modulating Member 74

As shown in FIGS. 2 and 8A, the light-emitting module 100 may include the third light-modulating member 74. The third light-modulating member 74 is reflective and transmissive to the light emitted by the light source part 20. It is preferable for the transmittance of the third light-modulating member 74 for the peak wavelength of the light source part 20 to be, for example, not less than 1% and not more than 50%, and more favorably not less than 3% and not more than 30%. It is preferable for the reflectance of the third light-modulating member 74 to be set to be less than the reflectance of the second light-modulating member 25. Thereby, the scale unevenness can be reduced between the portion at which the third light-modulating member 74 exists and the portion at which there is no third light-modulating member 74. For example, it is preferable for the reflectance of the third light-modulating member 74 for the peak wavelength of the light source part 20 to be not less than 20% and not more than 90%, and more favorably not less than 30% and not more than 85%. The third light-modulating member 74 can include a light-transmitting resin, a light-diffusing agent that is included in the light-transmitting resin, etc. The light-transmitting resin is, for example, a silicone resin, an epoxy resin, or an acrylic resin. For example, particles of $TiO_2$, $SiO_2$, $Al_2O_3$, ZnO, glass, etc., are examples of the light-diffusing agent.

As shown in FIG. 1, the third light-modulating member 74 is located at a position that overlaps the light source part 20 when viewed in top-view. In the example shown in FIG. 1, the third light-modulating member 74 is a rectangle that is larger than the rectangular first light source 20A when viewed in plan. When viewed in plan, the third light-modulating member 74 can have a shape such as a circle, a triangle, a hexagon, an octagon, etc.

A portion of the light that is emitted from the upper surface of the second light-modulating member 25 is reflected by the third light-modulating member 74; and another portion passes through the third light-modulating member 74. The luminance directly above the first light source 20A can be reduced thereby, and the luminance of the region directly above the first light source 20A can be prevented from becoming greater than the luminance of the other regions. The third light-modulating member 74 can cover the entirety or a portion of the upper surface of the second light-transmitting member 71. The third light-modulating member 74 may cover from the upper surface of the second light-transmitting member 71 to the first A-major surface 11A that is positioned at the vicinity of the upper surface of the second light-transmitting member 71. The amount of the light from the first light source 20A is more easily modulated by the third light-modulating member 74 by the third light-modulating member 74 covering the upper surface of the second light-transmitting member 71 and a portion of the first A-major surface 11A.

Figure 8D:
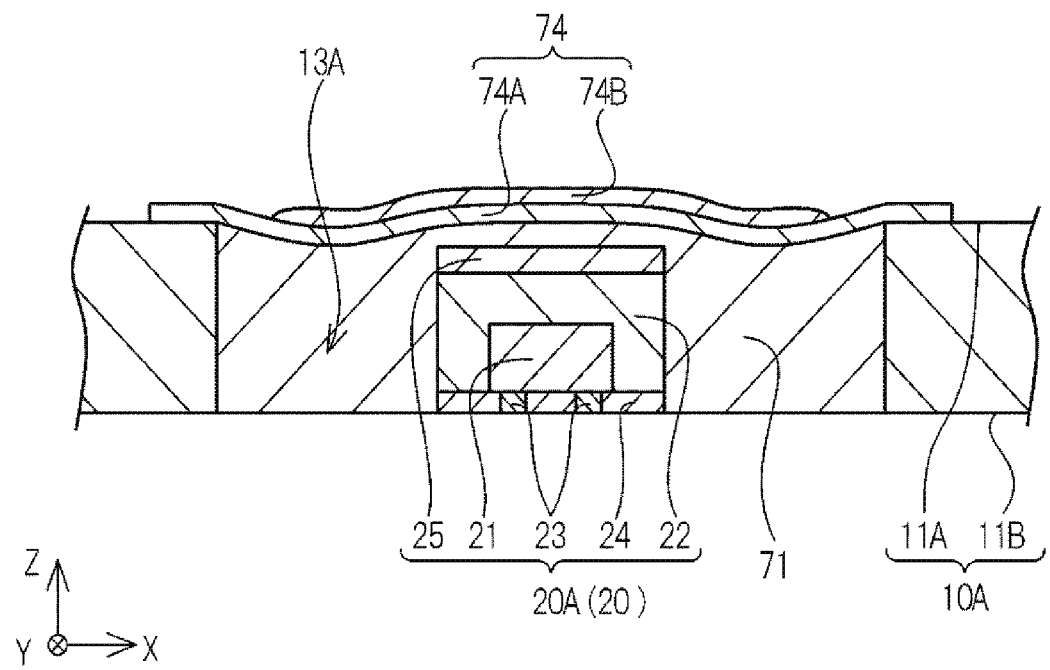
FIG. 8D is a schematic cross-sectional view showing a periphery of a light source part, a second light-transmitting member, and a third light-modulating member according to a modification of the embodiment.

The third light-modulating member 74 may include a single layer in the third direction as shown in FIG. 8A, or may include a stacked body that includes a third A-light-modulating member 74A and a third B-light-modulating member 74B that covers the third A-light-modulating member 74A as shown in FIG. 8D. When the third light-modulating member 74 includes a stacked body, a transmissive bonding member may be located between each layer. The layers of the stacked body may include different types of materials. Although the sizes of the third A-light-modulating member 74A and the third B-light-modulating member 74B are not particularly limited, the size of the third B-light-modulating member 74B that is positioned at the upper side of the third A-light-modulating member 74A may be less than the size of the third A-light-modulating member 74A. Thus, the thickness of the third light-modulating member 74 can be easily changed. When the third light-modulating member 74 includes the third A-light-modulating member 74A and the third B-light-modulating member 74B, the thickness of the third light-modulating member 74 may be taken to be the total of the thickness of the third A-light-modulating member 74A and the thickness of the third B-light-modulating member 74B. For example, the amount of the light directly above the first light source 20A is more easily modulated by setting the thickness of the portion of the third light-modulating member 74 that is positioned directly above the first light source 20A to be greater than the thickness of the portion of the third light-modulating member 74 that is positioned at the vicinity of the first light guide part 10A. The thickness of the third light-modulating member 74 can be appropriately modified even when the third light-modulating member 74 includes a single layer in the third direction. For example, it is preferable for the thickness of the third light-modulating member 74 to be not less than 0.005 mm and not more than 0.2 mm, and more favorably not less than 0.01 mm and not more than 0.075 mm.

The third light-modulating member 74 may cover the upper surface of the second light-modulating member 25 via the second light-transmitting member 71 as shown in FIG. 8A, or may contact the upper surface of the second light-modulating member 25 as shown in FIG. 8B. The light-emitting module 100 is more easily downsized in the third direction (the Z-direction) by the third and second light-modulating members 74 and 25 contacting each other.

First Light-Reflecting Member 80

Figure 9:
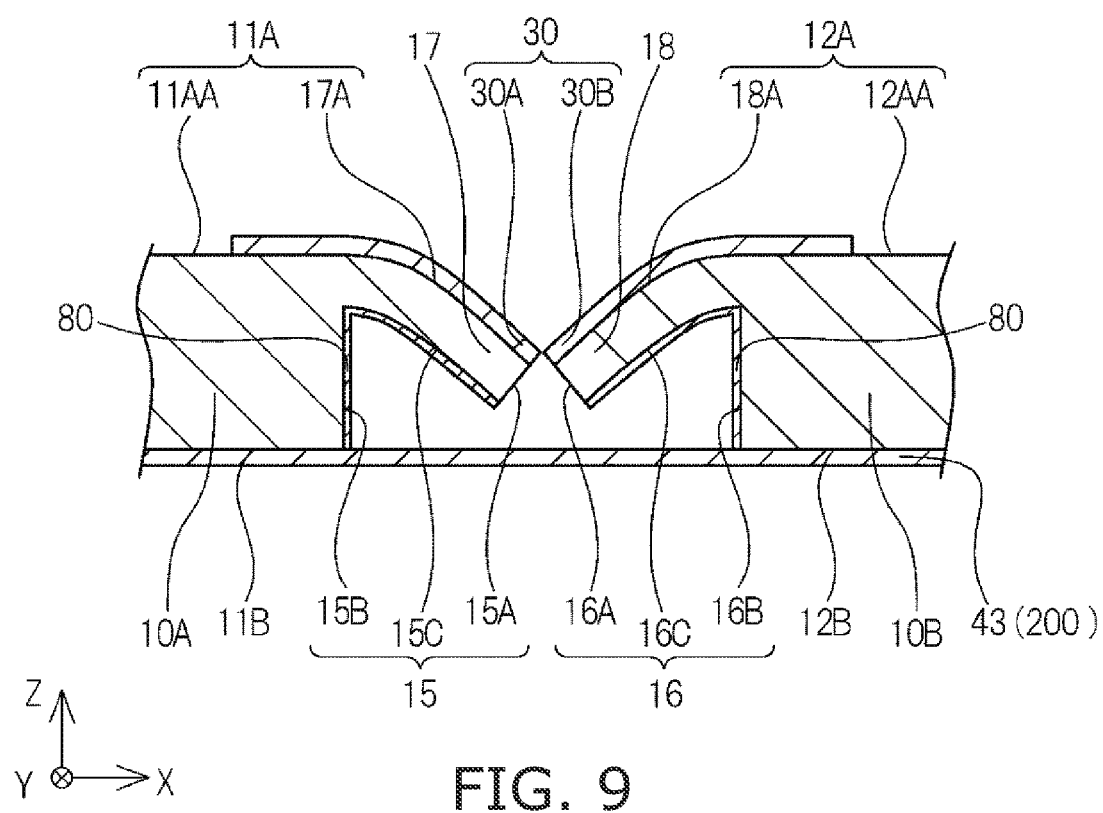
FIG. 9 is a schematic cross-sectional view showing a periphery of a first side surface, a second side surface, and a first light-modulating member according to a modification of the embodiment.

As shown in FIG. 9, the light-emitting module 100 may include a first light-reflecting member 80. The first light-reflecting member 80 is reflective to the light that is emitted by the light source part 20. It is preferable for the reflectance of the first light-reflecting member 80 for the peak wavelength of the light source part 20 to be, for example, not less than 20% and not more than 90%, and more favorably not less than 30% and not more than 85%. For example, a resin member that includes a light-diffusing agent can be used as the first light-reflecting member 80. For example, particles of $TiO_2$ are an example of the light-diffusing agent. Also, particles of $Nb_2O_5$, $BaTiO_3$, $Ta_2O_5$, $Zr_2O_3$, ZnO, $Y_2O_3$, $Al_2O_3$, MgO, $BaSO_4$, etc., are examples of the light-diffusing agent. For example, a metal member of Al, Ag, or the like may be used as the first light-reflecting member 80.

As shown in FIG. 9, the first light-reflecting member 80 covers the first side surface 15. Thereby, a portion of the light that is emitted from the first light source 20A and travels in the +X direction can be reflected by the first light-reflecting member 80. Therefore, the contrast between the first light guide part 10A and the second light guide part 10B when the first light source 20A is lit and the second light source 20B is not lit can be improved.

Support Member 200

The support member 200 includes a wiring substrate 50, a first bonding member 41, a second light-reflecting member 42, and a second bonding member 43.

As shown in FIG. 2, the first bonding member 41 is located between the wiring substrate 50 and the second light-reflecting member 42 and bonds the wiring substrate 50 and the second light-reflecting member 42. The second bonding member 43 is located between the second light-reflecting member 42 and the light guide member 10 and bonds the second light-reflecting member 42 and the light guide member 10. The second bonding member 43 contacts the first and second B-major surfaces 11B and 12B.

The first light source 20A is disposed on the second bonding member 43 in the first hole portion 13A. The second light source 20B is disposed on the second bonding member 43 in the second hole portion 13B. The second bonding member 43 is transmissive to the light emitted by the light source part 20. For example, an epoxy resin, an acrylic resin, a cyclic polyolefin resin, etc., are examples of the first and second bonding members 41 and 43.

The second light-reflecting member 42 is located below the light guide member 10. The second light-reflecting member 42 overlaps the light guide member 10 when viewed in top-view.

The second light-reflecting member 42 is reflective to the light emitted by the light source part 20. The second light-reflecting member 42 can include, for example, a resin member that includes many bubbles, or a resin member that includes a light-diffusing agent. The material of the resin member is, for example, a polyethylene terephthalate (PET) resin, a cyclic polyolefin resin, an acrylic resin, a silicone resin, a urethane resin, an epoxy resin, etc. For example, $SiO_2$, $CaF_2$, $MgF_2$, $TiO_2$, $Nb_2O_5$, $BaTiO_3$, $Ta_2O_5$, $Zr_2O_3$, ZnO, $Y_2O_3$, $Al_2O_3$, MgO, $BaSO_4$, etc., can be used as the light-diffusing agent.

The wiring substrate 50 includes an insulating base and at least one layer of a wiring layer. A connection portion 51A that is a portion of a wiring layer is located at the back surface of the wiring substrate 50 at the side opposite to the surface at which the first bonding member 41 is located. The back surface of the wiring substrate 50 is covered with a first insulating film 52. The connection portion 51A is not covered with the first insulating film 52 and is exposed from under the first insulating film 52.

A connection member 61 is located below the light source part 20 in the support member 200. At least a portion of the electrode 23 of the light source part 20 is located on the connection member 61 and is connected to the connection member 61.

The connection member 61 extends between the second bonding member 43 and the first insulating film 52 and extends from the through-portion to the connection portion 51A that is located at the back surface of the wiring substrate 50. The connection member 61 is conductive and electrically connects the connection portion 51A and the electrode 23 of the light source part 20. The connection member 61 is, for example, a conductive paste in which a conductive filler is dispersed in a binder resin. The connection member 61 can include, for example, a particulate metal of copper, silver, etc., as the filler.

The connection member 61 that is connected with the electrode 23 at the positive side of the light source part 20 and the connection member 61 that is connected with the electrode 23 at the negative side of the light source part 20 are separated from each other and are not electrically connected. A second insulating film 53 is located at the front surface of the first insulating film 52 to cover the connection member 61. The second insulating film 53 is formed to cover between the pair of connection members 61 that correspond to the pair of positive and negative electrodes 23 and increases the insulative properties between the pair of positive and negative connection members 61.

In the planar light source 300 of the embodiment configured as described above, the light from the light source part 20 that is guided through the light guide member 10 toward the first B-major surface side is reflected by the second light-reflecting member 42 toward the first A-major surface 11A side that is the light-emitting surface of the planar light source 300; and the amount of the light from the first A-major surface 11A that is the light-emitting surface can be increased.

An example of a method for manufacturing the planar light source 300 will now be described with reference to FIGS. 10A to 12G.

Figure 10A:
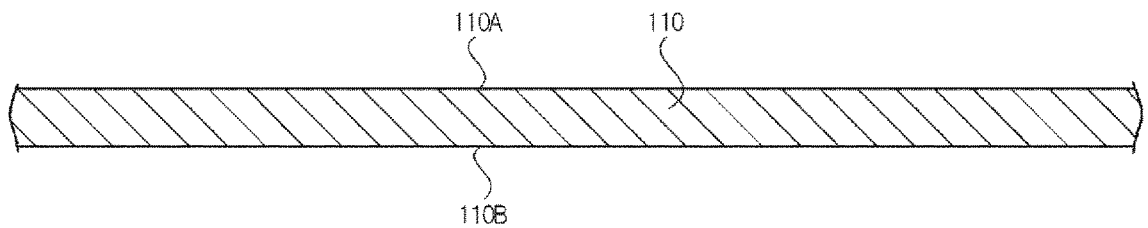
FIG. 10A is a schematic cross-sectional view showing a method of manufacturing a planar light source according to the embodiment.
Figure 10B:
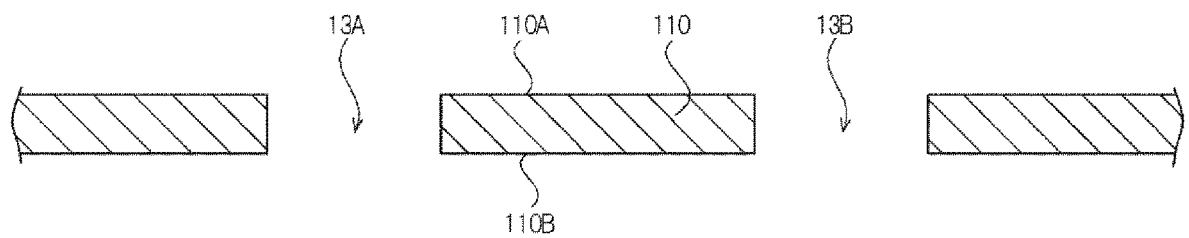
FIG. 10B is a schematic cross-sectional view showing the method of manufacturing a planar light source according to the embodiment.
Figure 10C:
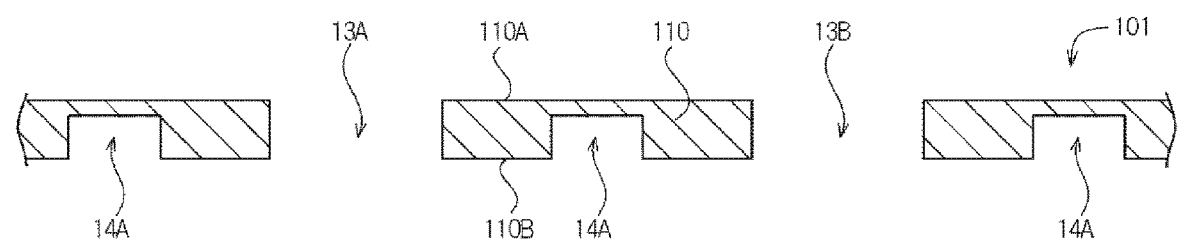
FIG. 10C is a schematic cross-sectional view showing the method of manufacturing a planar light source according to the embodiment.

The method for manufacturing the planar light source 300 of the embodiment includes a process of preparing a structure body 101 shown in FIG. 10C. The process of preparing the structure body 101 includes a process of preparing a light guide plate 110 shown in FIG. 10A. The light guide plate 110 includes a first major surface 110A, and a second major surface 110B that is positioned at the side opposite to the first major surface 110A. The light guide plate 110 shown in FIG. 10A may be prepared by procurement, etc.

As shown in FIG. 10B, the first hole portion 13A and the second hole portion 13B are formed in the light guide plate 110. For example, the first hole portion 13A and the second hole portion 13B are formed as through-holes that extend through the light guide plate 110 by drilling, punching, or laser patterning. The members in the intermediate states of each process may be prepared by procurement. For example, the light guide plate 110 shown in FIG. 10B in which the first hole portion 13A and the second hole portion 13B are formed may be prepared by procurement. A description of the preparation being possible by procurement in each process is omitted as appropriate.

As shown in FIG. 10C, a first trench portion 14A is formed in the light guide plate 110. The first trench portion 14A is formed as a bottomed trench that is open at the second major surface 110B side. The depth of the first trench portion 14A is greater than the distance between the first major surface 110A and the bottom surface of the first trench portion 14A. For example, the first trench portion 14A is formed by cutting or laser patterning. The structure body 101 can be obtained thereby. The light guide plate 110 may be cut to make the size of the structure body 101 when viewed in top-view into the desired size. The structure body 101 shown in FIG. 10C may be prepared by procurement, etc.

Figure 11A:
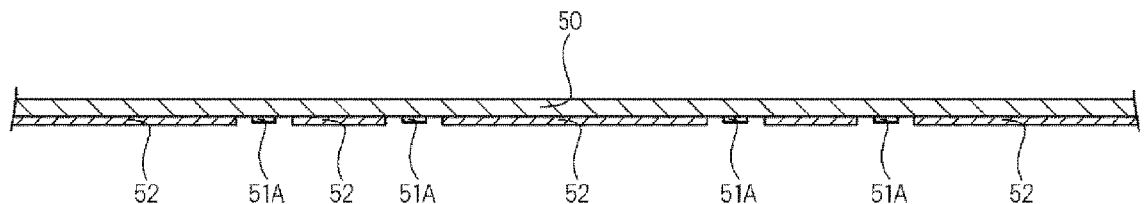
FIG. 11A is a schematic cross-sectional view showing the method of manufacturing a planar light source according to the embodiment.
Figure 11B:
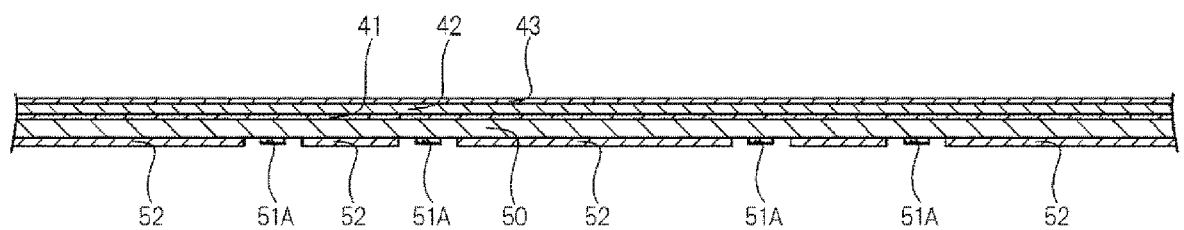
FIG. 11B is a schematic cross-sectional view showing the method of manufacturing a planar light source according to the embodiment.
Figure 11C:
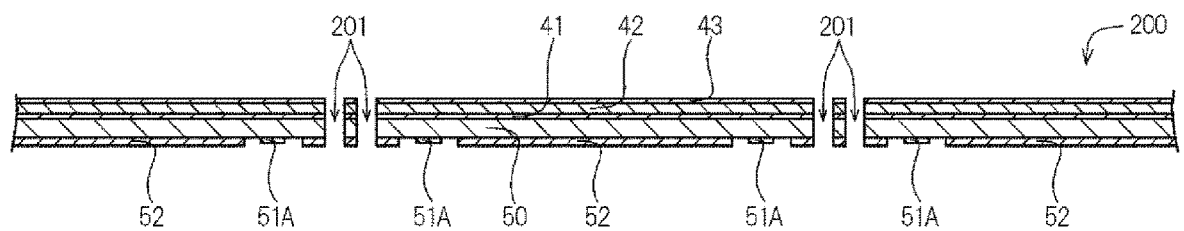
FIG. 11C is a schematic cross-sectional view showing the method of manufacturing a planar light source according to the embodiment.

The method for manufacturing the planar light source 300 of the embodiment includes a process of preparing the support member 200 shown in FIG. 11C. The process of preparing the support member 200 includes a process of preparing the wiring substrate 50 shown in FIG. 11A. The connection portion 51A and the first insulating film 52 are located at the back surface of the wiring substrate 50. The connection portion 51A is located in the opening formed in the first insulating film 52 and is exposed from under the first insulating film 52.

As shown in FIG. 11B, the first bonding member 41, the second light-reflecting member 42, and the second bonding member 43 are stacked on the surface of the wiring substrate 50 at the side opposite to the surface at which the connection portion 51A is located.

As shown in FIG. 11C, connection holes 201 that extend through the second bonding member 43, the second light-reflecting member 42, the first bonding member 41, the wiring substrate 50, and the first insulating film 52 are formed; and the support member 200 is obtained. For example, the connection holes 201 are formed by punching, drilling, or laser patterning. The shape of the connection hole 201 when viewed in plan is circular. Other than circular, the shape of the connection hole 201 when viewed in plan may be elliptical or polygonal. One connection hole 201 of the connection holes 201 faces one electrode (e.g., the positive electrode) of the pair of positive and negative electrodes 23 of the light source part 20; and one connection hole 201 faces the other electrode (e.g., the negative electrode) of the pair of positive and negative electrodes 23. One electrode 23 overlaps one connection hole 201 when viewed in plan. At this time, it is sufficient for the size of one connection hole 201 when viewed in plan to be such that at least a portion of the lower surface of the one electrode 23 is exposed in the wiring substrate 50. The support member 200 shown in FIG. 11C may be prepared by procurement.

Figure 12A:
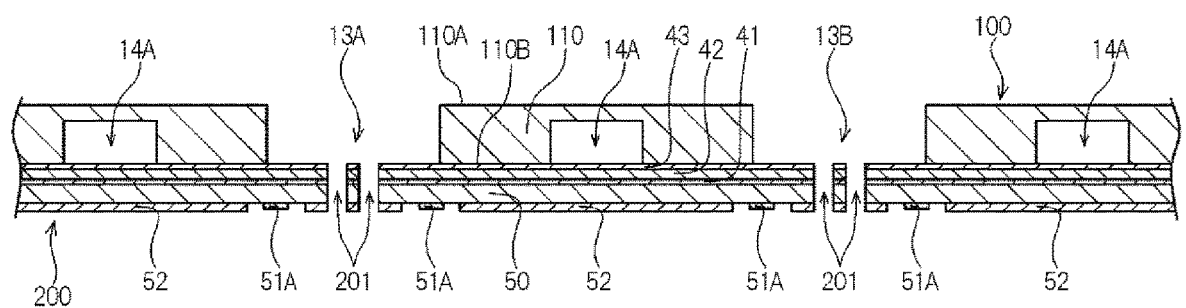
FIG. 12A is a schematic cross-sectional view showing the method of manufacturing a planar light source according to the embodiment.

As shown in FIG. 12A, the structure body 101 is disposed on the support member 200. The second major surface 110B of the light guide plate 110 is bonded to the second bonding member 43 of the support member 200. The connection holes 201 that are formed in the support member 200 overlap and communicate with the first and second hole portions 13A and 13B that are formed in the light guide plate 110. Two connection holes 201 overlap one first hole portion 13A; and two connection holes 201 overlap one second hole portion 13B. The opening of the first trench portion 14A faces the second bonding member 43 that forms the upper surface of the support member 200. The first trench portion 14A is positioned between the first major surface 110A of the light guide plate 110 and the upper surface of the support member 200.

Figure 12B:
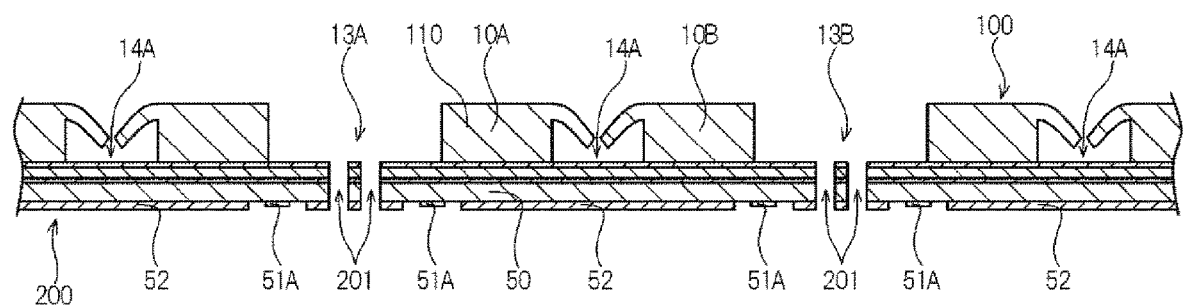
FIG. 12B is a schematic cross-sectional view showing the method of manufacturing a planar light source according to the embodiment.

As shown in FIG. 12B, after the structure body 101 is disposed on the support member 200, the portion of the light guide plate 110 that is linked at the bottom surface portion of the first trench portion 14A is cut. Thereby, the light guide plate 110 can be divided into the first and second light guide parts 10A and 10B. A known member such as a blade, etc., can be used for the cutting. For example, when the light guide plate 110 includes a resin material, the portion of the light guide plate 110 that is positioned above the first trench portion 14A can be tilted downward by cutting downward from above. According to the embodiment, by dividing the light guide plate 110 into the first and second light guide parts 10A and 10B, the warp of the light guide plate 110 that occurs in subsequent heat treatment can be reduced compared to when the light guide plate 110 is linked at the position of the first trench portion 14A. The portion of the light guide plate 110 that is positioned above the first trench portion 14A may not be cut. That is, the first light guide part 10A and the second light guide part 10B may be linked. The upper surface of the light guide plate 110 that is positioned above the first trench portion 14A and links the first light guide part 10A and the second light guide part 10B may be parallel to the lateral direction or may be tilted downward. When viewed in cross-section, the shape of the light guide plate 110 that is positioned above the first trench portion 14A may be substantially V-shaped. Substantially V-shaped includes not only a shape in which straight lines cross, but also a shape in which curves cross.

Figure 12C:
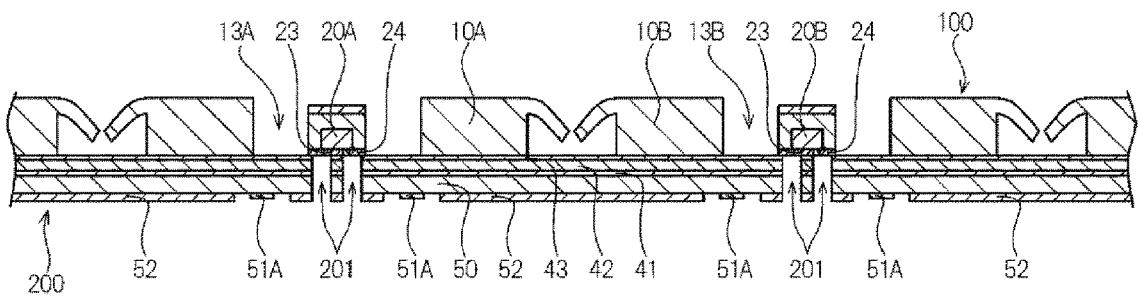
FIG. 12C is a schematic cross-sectional view showing the method of manufacturing a planar light source according to the embodiment.

After dividing the light guide plate 110 into the first and second light guide parts 10A and 10B, the first light source 20A is disposed in the first hole portion 13A as shown in FIG. 12C. For example, the upper surface of the second bonding member 43 and the lower surface of the cover member 24 that is the lower surface of the first light source 20A may be bonded. When viewed in top-view, the first light source 20A is disposed so that the electrode 23 of the first light source 20A and the connection hole 201 that is formed in the support member 200 overlap. At least a portion of the lower surface of the electrode 23 is exposed in the support member 200 via the connection hole 201. The second light source 20B is disposed similarly to the first light source; and a description is therefore omitted as appropriate.

Figure 12D:
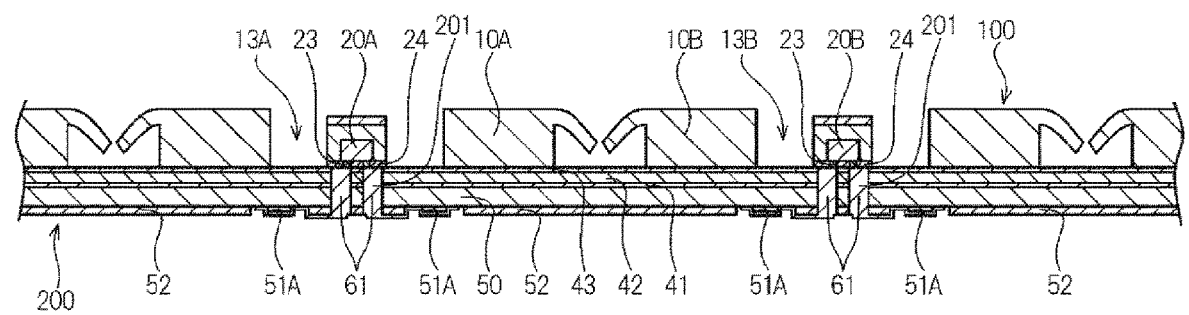
FIG. 12D is a schematic cross-sectional view showing the method of manufacturing a planar light source according to the embodiment.

After disposing the first light source 20A in the first hole portion 13A, the connection member 61 is formed in the connection hole 201 as shown in FIG. 12D. The connection member 61 that is connected with the electrode 23 of the first light source 20A can be formed by, for example, disposing a conductive paste in the connection hole 201 and by subsequently curing. The connection member 61 also is formed at the back surface of the wiring substrate 50 and is connected with the connection portion 51A of the wiring layer.

Figure 12E:
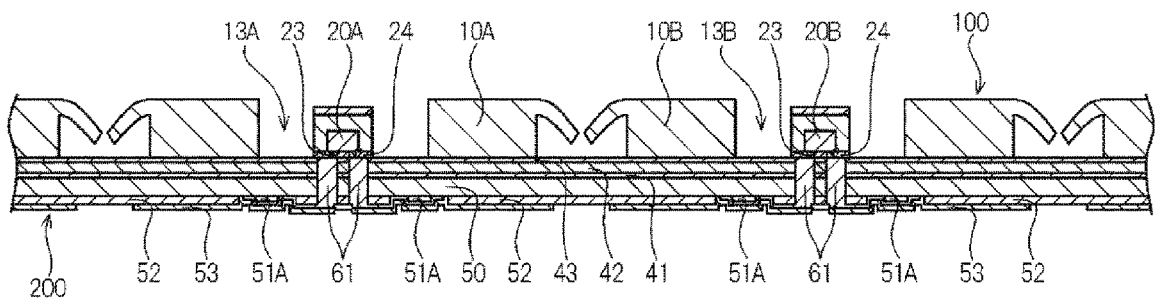
FIG. 12E is a schematic cross-sectional view showing the method of manufacturing a planar light source according to the embodiment.

After forming the connection member 61, the second insulating film 53 is formed to cover the connection member 61 at the lower surface of the support member 200 as shown in FIG. 12E. For example, the second insulating film 53 is formed by a method such as printing, potting, spraying, inkjet, bonding a resin sheet, etc.

Figure 12F:
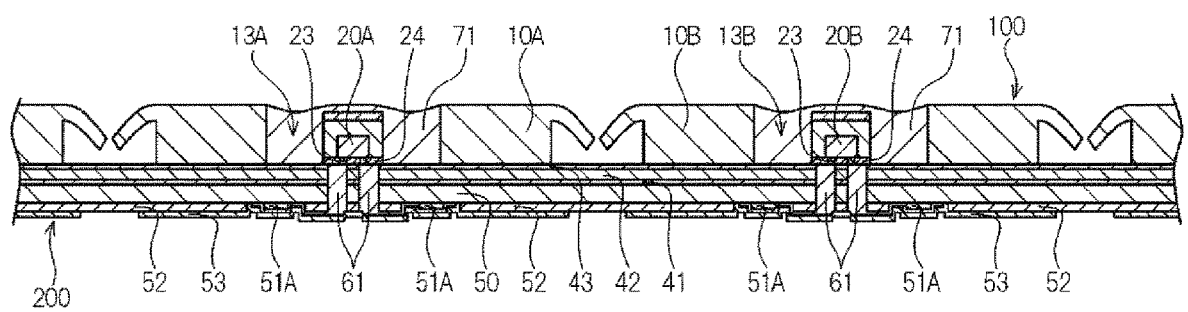
FIG. 12F is a schematic cross-sectional view showing the method of manufacturing a planar light source according to the embodiment.

After forming the second insulating film 53, the second light-transmitting member 71 is formed in the first hole portion 13A as shown in FIG. 12F. The second light-transmitting member 71 is formed to cover the side surface of the first light source 20A. For example, the second light-transmitting member 71 can be formed by supplying a liquid light-transmitting resin into the first hole portion 13A and by subsequently curing by heating the light-transmitting resin.

Figure 12G:
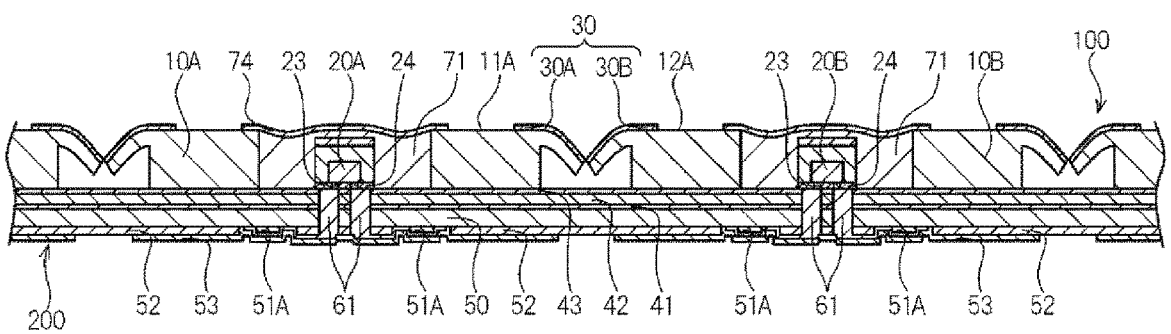
FIG. 12G is a schematic cross-sectional view showing the method of manufacturing a planar light source according to the embodiment.

After forming the second light-transmitting member 71, the first light-modulating member 30 that covers the first A-major surface 11A is formed as shown in FIG. 12G. For example, the first light-modulating member 30 is formed by a method such as printing, potting, spraying, inkjet, bonding a resin sheet, etc. After forming the second light-transmitting member 71, the third light-modulating member 74 that covers the second light-transmitting member 71 is formed as shown in FIG. 12G. For example, the third light-modulating member 74 is formed by a method such as printing, potting, spraying, inkjet, bonding a resin sheet, etc. The first light-modulating member 30 and the third light-modulating member 74 may be formed by the same process or by separate processes. The third light-modulating member 74 may be formed after forming the first light-modulating member 30; or the first light-modulating member 30 may be formed after forming the third light-modulating member 74. The planar light source 300 shown in FIG. 2 can be obtained thereby. Also, the first light-modulating member 30 and/or the third light-modulating member 74 may be formed after switching the light source part 20 on and checking the uneven luminance of the planar light source 300. The uneven luminance of the planar light source 300 can be reduced by checking the uneven luminance and by re-forming the first light-modulating member 30 and/or the third light-modulating member 74 in a portion that is too bright. The uneven luminance may be checked by switching the light source part 20 on before forming the first light-modulating member 30 and/or the third light-modulating member 74. Thereby, the uneven luminance of the planar light source 300 is more easily reduced because the first light-modulating member 30 and/or the third light-modulating member 74 in which the thickness, position, etc., are adjusted can be formed. The light-emitting module 100 and/or the support member 200 may be cut so that the size of the planar light source 300 when viewed in top-view is the desired size.

The method for manufacturing the planar light source 300 described above is an example; various modifications are possible within the limits of technical feasibility. For example, the first light-modulating member 30 may be formed on the first major surface 110A of the light guide plate 110 before disposing the structure body 101 on the support member 200. In such a case, the first light-modulating member 30 may be divided into the first A-light-modulating member 30A that covers the first light guide part 10A and the first B-light-modulating member 30B that covers the second light guide part 10B by cutting in the cutting process that divides the light guide plate 110 into the first and second light guide parts 10A and 10B. Also, the first light-modulating member 30 may be formed multiple times. For example, the first light-modulating member 30 may be formed a first time on the first major surface 110A of the light guide plate 110 before disposing the structure body 101 on the support member 200; and the first light-modulating member 30 may be formed a second time after switching the light source part 20 on and checking the uneven luminance of the planar light source 300.

Hereinabove, exemplary embodiments of the invention are described with reference to specific examples. However, the invention is not limited to these specific examples. All configurations practicable by an appropriate design modification by one skilled in the art based on exemplary embodiments of the invention described above also are within the scope of the invention to the extent that the purport of the invention is included. Furthermore, various modifications and alterations within the spirit of the invention will be readily apparent to those skilled in the art. All such modifications and alterations should therefore be seen as within the scope of the invention.

What is claimed is:
1. A light-emitting module comprising:
a first light source;
a second light source;
a first light guide part including a first A-major surface,
a first B-major surface positioned at a side opposite to the first A-major surface,
a first side surface positioned between the first A-major surface and the first B-major surface, and
a first hole portion in which the first light source is disposed;
a second light guide part including
a second A-major surface,
a second B-major surface positioned at a side opposite to the second A-major surface,
a second side surface positioned between the second A-major surface and the second B-major surface, the second side surface facing the first side surface of the first light guide part, and
a second hole portion in which the second light source is disposed; and
a first light-modulating member positioned at an upper side of the first A-major surface, the first light-modulating member overlapping the first A-major surface and the first side surface when viewed in top-view, wherein
the first light guide part further includes a first protrusion,
the second light guide part further includes a second protrusion,
the first protrusion faces the second protrusion, and
the first light-modulating member is disposed on the first protrusion and the second protrusion.

2. The light-emitting module according to claim 1, wherein
the first light-modulating member overlaps the second A-major surface and the second side surface of the second light guide part when viewed in top-view.

3. The light-emitting module according to claim 2, wherein
a portion of the first light-modulating member is positioned lower than an upper surface of the first light source.

4. The light-emitting module according to claim 3, wherein
the first light-modulating member and the first light guide part are in contact with each other.

5. The light-emitting module according to claim 4, wherein
the first light-modulating member continuously covers the first A-major surface and the first side surface.

6. The light-emitting module according to claim 5, wherein
the first side surface of the first light guide part includes a first A-side surface and a first B-side surface,
the second side surface of the second light guide part includes
a second A-side surface facing the first A-side surface, and
a second B-side surface facing the first B-side surface,
a distance between the first A-side surface and the second A-side surface is less than a distance between the first B-side surface and the second B-side surface, and
the first light-modulating member overlaps the first B-side surface when viewed in top-view.

7. The light-emitting module according to claim 6, wherein
the first light-modulating member is a resin member that includes a light-diffusing material.

8. The light-emitting module according to claim 1, wherein
a portion of the first light-modulating member is positioned lower than an upper surface of the first light source.

9. The light-emitting module according to claim 1, wherein
the first light-modulating member and the first light guide part are in contact with each other.

10. The light-emitting module according to claim 1, wherein
the first light-modulating member continuously covers the first A-major surface and the first side surface.

11. The light-emitting module according to claim 1, wherein
the first side surface of the first light guide part includes a first A-side surface and a first B-side surface,
the second side surface of the second light guide part includes
a second A-side surface facing the first A-side surface, and
a second B-side surface facing the first B-side surface,
a distance between the first A-side surface and the second A-side surface is less than a distance between the first B-side surface and the second B-side surface, and
the first light-modulating member overlaps the first B-side surface when viewed in top-view.

12. The light-emitting module according to claim 1, wherein
the first light-modulating member is a resin member that includes a light-diffusing material.

13. The light-emitting module according to claim 1, wherein
the first light-modulating member continuously surrounds the first light source when viewed in top-view.

14. The light-emitting module according to claim 1, further comprising:
a plurality of additional first light-modulating members spaced apart from each other around the first light source when viewed in top-view.

15. The light-emitting module according to claim 1, wherein
at least a part of the first side surface of the first light guide part is spaced apart from at least a part of the second side surface of the second light guide part.

16. A planar light source comprising:
a support member; and
the light-emitting module according to claim 1, the light-emitting module being disposed on the support member with the first B-major surface of the first light guide part and the second B-major surface of the second light guide part facing the support member.

17. The planar light source according to claim 16, wherein the support member and the first light-modulating member are in contact with each other.

* * * * *